United States Patent
Ivanov et al.

(10) Patent No.: US 11,604,603 B2
(45) Date of Patent: Mar. 14, 2023

(54) METHOD AND SYSTEM FOR PERSISTENT PARTITIONABLE DISTRIBUTED MAP USING SPARSE ARRAYS AND SPARSE ORDERED TWO-BIT BITMAPS IN SHARED MEMORY

(71) Applicant: Hewlett Packard Enterprise Development LP, Houston, TX (US)

(72) Inventors: Dmitry L. Ivanov, Branchburg, NJ (US); Yann Livis, Bedminster, NJ (US); Oleg Neverovitch, Hillsborough, NJ (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 85 days.

(21) Appl. No.: 17/355,000

(22) Filed: Jun. 22, 2021

(65) Prior Publication Data

US 2022/0405006 A1    Dec. 22, 2022

(51) Int. Cl.
*G06F 3/06* (2006.01)

(52) U.S. Cl.
CPC .......... *G06F 3/0655* (2013.01); *G06F 3/0604* (2013.01); *G06F 3/067* (2013.01); *G06F 3/0644* (2013.01)

(58) Field of Classification Search
CPC .... G06F 3/0655; G06F 3/0604; G06F 3/0644; G06F 3/067
See application file for complete search history.

(56) References Cited

U.S. PATENT DOCUMENTS

2008/0077590 A1*   3/2008   Pandit ................. G06F 11/1435
2018/0285419 A1*  10/2018   Chernov ............. G06F 16/2237

OTHER PUBLICATIONS

Alvarez et al., "A Comparison of Adaptive Radix Trees and Hash Tables", IEEE 31st International Conference on Data Engineering, 2015, 12 pages.
Boost, "Mapping Address Independent Pointer: offset_ptr", available online at <https://www.boost.org/doc/libs/1_35_0/doc/html/interprocess/offset_ptr.html>, 2015, 2 pages.
(Continued)

*Primary Examiner* — Ryan Bertram
(74) *Attorney, Agent, or Firm* — Park, Vaughan, Fleming & Dowler LLP

(57) ABSTRACT

One aspect facilitates a global map in a distributed system. The system generates a first data structure which comprises key-value pairs, wherein, in a respective key-value pair, the respective key is an integer and the respective value comprises a pointer to a sparse array which includes a bitmap (such as an ordered two-bit bitmap). The system stores the first data structure as a first partition of the global map. The system searches, based on a pattern, the first data structure to obtain a first value. If the first value comprises a two-bit bitmap, the system converts, based on the pattern, the first value to a two-dimensional bitmap, and performs a function on the first value to obtain a first result. The system uses the first value or the first result as metadata to execute a read or write operation in a filesystem associated with the distributed system.

20 Claims, 15 Drawing Sheets

(56) References Cited

OTHER PUBLICATIONS

Debian, "Package: libjudy-dev (1.0.5-5 and others) C library for creating and accessing dynamic arrays (dev package)", available onloine at <https://packages.debian.org/buster/libjudy-dev>, 2022, 2 pages.
Desnoyers, Mathieu, "Linux Plumbers Conference Scaling Microconference", RCU Judy Arrays: cache-efficient, compact, fast and scalable trie, Aug. 2012, 35 pages.
Github, "Mabain: a key-value store library", available online at <https://github.com/chxdeng/mabain>, Dec. 18, 2021, 6 pages.
Github, "Userspace RCU Implementation", available online at <https://github.com/urcu/userspace-rcu/>, 2012, 11 pages.
Paul E, McKenney, "What is RCU, Fundamentally?", LWN NET, available online at <http://lwn.net/Articles/262464/>, Dec. 17, 2007, 22 pages.
Wikipedia, "Judy array", available online at <https://en.wikipedia.org/wiki/Judy_array>, Apr. 2022, 3 pages.

\* cited by examiner

| PATTERN SET 202 | BITFIELD 204 | TETRAL DIGIT(S) 206 |
|---|---|---|
| 0 | 0b0000 | {...} |
| 1 | 0b0001 | {'00'} |
| 2 | 0b0010 | {'01'} |
| 3 | 0b0011 | {'00', '01'} |
| 4 | 0b0100 | {'10'} |
| 5 | 0b0101 | {'00', '10'} |
| 6 | 0b0110 | {'01', '10'} |
| 7 | 0b0111 | {'00', '01', '10'} |
| 8 | 0b1000 | {'11'} |
| 9 | 0b1001 | {'00', '11'} |
| 10 | 0b1010 | {'01', '11'} |
| 11 | 0b1011 | {'00', '01', '11'} |
| 12 | 0b1100 | {'10', '11'} |
| 13 | 0b1101 | {'00', '10', '11'} |
| 14 | 0b1110 | {'01', '10', '11'} |
| 15 | 0b1111 | {'00', '01', '10', '11'} |

FIG. 2A

| NAME 212 | WORD 214 | PATTERN SET 216 | PATTERN SIZE 218 | MASK[P] = ((Pattern)) 220 |
|---|---|---|---|---|
| Given TBB = {0, 1, 2, 3} | 00 01 10 11 | 2 = 0b0010 = {'01'} | 1 | 01 01 01 01 |

Pattern size ?= 1 → YES.
Calculate (t AND ((t AND ((b'10')))>>1)) where t := w XOR ~mask[P]

| w | 00 01 10 11 | } XOR 231 |
|---|---|---|
| ~mask[P] | 10 10 10 10 | |
| t := (w XOR ~mask[P]) | 10 11 00 01 | } AND 232 |
| ((b'10')) | 10 10 10 10 | |
| t AND ((b'10')) | 10 10 00 00 | } SHIFT 233 |
| t AND ((b'10')) >>1 | 01 01 00 00 | |

| t := (w XOR ~mask[P]) | 10 11 00 01 | } AND 234 |
|---|---|---|
| t AND ((b'10')) >>1 | 01 01 00 00 | |
| (t AND ((t AND ((b'10'))) >>1)) | 00 01 00 00 | → _0 _1 _0 _0  } RESULT 235 |

FIG. 2B

| NAME 212 | WORD 214 | PATTERN SET 216 | PATTERN SIZE 218 | MASK[P] = ((Pattern)) 218 |
|---|---|---|---|---|
| Given TBB = {1, 3, 0, 2} | 01 11 00 10 | 5 = 0b0010 = {'00', '10'} | 2 | n/a |

Pattern size ?= 2 → YES. Tetral digits indicated as pattern == 5? YES.
Calculate w := ~w, and (w AND ((b'01')))

| w | 01 11 00 10 | } INVERT 241 |
|---|---|---|
| w := ~w | 10 00 11 01 | } AND 242 |
| ((b'01')) | 01 01 01 01 | |
| w = (w AND ((b'01'))) | 00 00 01 01 | → _0 _0 _1 _1  } RESULT 243 |

FIG. 2C

| NAME 212 | WORD 214 | PATTERN SET 216 | PATTERN SIZE 218 | MASK[P] = ((Pattern)) 220 |
|---|---|---|---|---|
| Given TBB = {0, 1, 2, 3} | 00 01 10 11 | 8 = 0b1000 = {'11'} | 1 | 11 11 11 11 |

250

Pattern size ?= 1 → YES.
Calculate (t AND ((t AND ((b'10')))>>1)) where t := w XOR ~mask[P]

| w | 00 01 10 11 | ⎫ |
|---|---|---|
| ~mask[P] | 00 00 00 00 | ⎬ XOR 251 |
| t := (w XOR ~mask[P]) | 00 01 10 11 | ⎫ |
| ((b'10')) | 10 10 10 10 | ⎬ AND 252 |
| t AND ((b'10')) | 00 00 10 10 | ⎫ SHIFT 253 |
| t AND ((b'10')) >>1 | 00 00 01 01 | |

| t := (w XOR ~mask[P]) | 00 01 10 11 | ⎫ |
|---|---|---|
| t AND ((b'10')) >>1 | 00 00 01 01 | ⎬ AND 254 |
| (t AND ((t AND ((b'10')))>>1)) | 00 00 00 01 | |

→ | _0 _0 _0 _1 | ⎬ RESULT 255

FIG. 2D

| NAME 212 | WORD 214 | PATTERN SET 216 | PATTERN SIZE 218 | MASK[~P] = ((~Pattern)) 222 |
|---|---|---|---|---|
| Given TBB = {1, 3, 0, 2} | 01 11 00 10 | 13 = 0b1101 = {'00', '10', '11'} | 3 | 01 01 01 01 |

260

Pattern size ?= 3 → YES.
Calculate t1 := w XOR ~mask[~P]; and t2 := t1 AND ((b'10")); and
w = (t1 AND (t2>>1)) XOR (b'01'))

~P=0b0010={'01'}  261

| ~P | 01 | |
|---|---|---|
| mask[~P] | 01 01 01 01 | } INVERT 262 |
| ~mask[~P] | 10 10 10 10 | } XOR 263 |
| w | 01 11 00 10 | |
| t1 := (w XOR ~mask[~P]) | 11 01 10 00 | } AND 264 |
| ((b'10')) | 10 10 10 10 | } SHIFT 265 |
| t2 := t1 AND ((b'10')) | 10 00 10 00 | |
| t2 >>1 | 01 00 01 00 | |

| t1 := (w XOR ~mask[~P]) | 11 01 10 00 | } AND 266 |
|---|---|---|
| t2 >>1 | 01 00 01 00 | |
| t1 AND (t2 >>1) | 01 00 00 00 | } XOR 267 |
| ((b'10')) | 01 01 01 01 | |
| (t1 AND (t2>>1)) XOR ((b'01')) | 00 01 01 01 | → _0 _1 _1 _1 } RESULT 268 |

FIG. 2E

METHOD AND SYSTEM FOR PERSISTENT PARTITIONABLE DISTRIBUTED MAP USING SPARSE ARRAYS AND SPARSE ORDERED TWO-BIT BITMAPS IN SHARED MEMORY

BACKGROUND

Field

This disclosure is generally related to the field of management. More specifically, this disclosure is related to persistent partitionable distributed data maps.

BRIEF DESCRIPTION OF THE FIGURES

FIG. 2A depicts a table which indicates how a pattern set is denoted using decimals of a bitfield, in accordance with an aspect of the present application.

FIG. 2B illustrates an example of converting one central processing unit (CPU) word of TBB, given a pattern of {'01'}, to an MEB, for the case of 8-bit CPU word size, corresponding to the flowchart in FIG. 1A, in accordance with an aspect of the present application.

FIG. 2C illustrates an example of converting a TBB, given a pattern of {'00', '10'}, to an MEB, corresponding to the flowchart in FIG. 1C, in accordance with an aspect of the present application.

FIG. 2D illustrates an example of converting a TBB, given a pattern of {'11'}, to an MEB, corresponding to the flowchart in FIG. 1A, in accordance with an aspect of the present application.

FIG. 2E illustrates an example of converting a TBB, given a pattern of {'00', '10', '11'} to a MEB, corresponding to the flowchart in FIG. 1B, in accordance with an aspect of the present application.

In the figures, like reference numerals refer to the same figure elements.

DETAILED DESCRIPTION

Figure 1A:
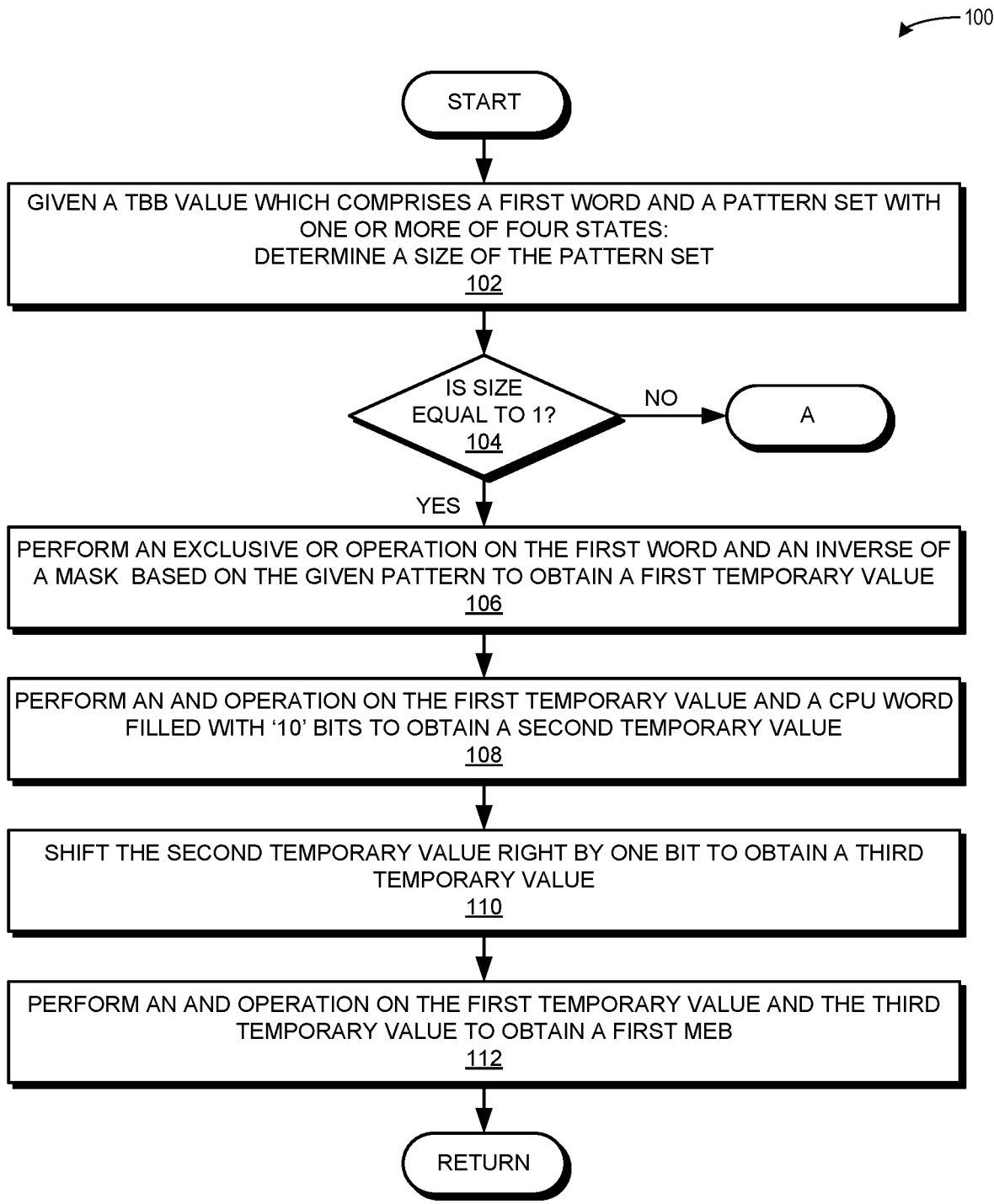
FIG. 1A presents a flowchart illustrating a method which converts a two-bit bitmap (TBB) to a two-dimensional (2D) Morton-encoded Boolean bitmap (MEB), in accordance with an aspect of the present application.

The following description is presented to enable any person skilled in the art to make and use the aspects of this application, and is provided in the context of a particular application and its requirements. Various modifications to the disclosed aspects of this application will be readily apparent to those skilled in the art, and the general principles defined herein may be applied to other aspects and applications without departing from the spirit and scope of the present disclosure. Thus, the scope of the present disclosure is not limited to the examples shown but is to be accorded the widest scope consistent with the principles and features disclosed herein.

In a distributed system or cluster with multiple components across multiple devices, applications may use a checkpoint/restart mechanism to handle failures related to the components. The overhead involved in the checkpoint/restart mechanism can affect the efficiency and performance of the overall system. High-performance computing (HPC) applications, e.g., in an exascale environment, can require high performance and a highly distributed input/output (I/O) subsystem. As a result, these HPC applications may require high-performance and distributed data structures to support metadata associated with the HPC applications, e.g., as used in space allocation, which is a common area of contention in a traditional distributed file system. An improvement in space allocation can result in a significant improvement in the performance of the distributed system and an associated filesystem. Furthermore, global or distributed metadata maps may involve certain space and performance requirements for efficient multiprocessing.

The aspects described herein provide a system which can improve space allocation in a distributed system by implementing a persistent partitionable distributed map (e.g., in a fabric attached memory filesystem (FAMfs) or other filesystem, hereinafter referred to as an "F-Map") using sparse arrays and sparse ordered two-bit bitmaps in shared memory. It can be feasibly challenging to use sparse arrays (as a radix trie or a list) for a filesystem in shared memory in both a space- and performance-efficient manner. For example, such an implementation of a global map would need to be compilable to execute with both the function-wrapping interface library for HPC tools (e.g., Gotcha) and with HPC applications.

Another challenge is that a common implementation of sparse arrays is based on lists or other pointer-dependent data structures which are inherently poor candidates for multiprocessing, because the pointers must be replaced with offsets to facilitate multi-process access to shared memory. One goal is to consume a minimal amount of virtual address space, as virtual address space is a precious resource with shared memory regions. Furthermore, another goal is to implement an underlying (i.e., hardware) cache coherence which allows for data access in a virtually lockless process manner. A trade-off generally exists between dynamic shared memory allocation (and re-allocation) costs, the space efficiency of a sparse array, and the performance costs of inter-process memory barriers and/or locks. This can create challenges in achieving both space and performance efficiency using sparse arrays.

The described aspects can address the challenge of achieving both space and performance efficiency by using specific constraints which can result in both space and performance efficiency by using sparse arrays in shared memory. "Space efficiency" can indicate that the space consumed by a sparse array in shared memory can be $O(S_i)$, where $S_i$ is the size of the array in the virtual address space of the process. "Performance efficiency" can indicate that the read access latency should be $O(n)$, where n is a number of readers. When the number of gaps in a sparse array is much smaller than the number of elements of the sparse array, an F-Map can achieve both efficiency goals (i.e., space efficiency and performance efficiency) in a model with concurrent access by "one writer, multiple readers" (e.g., when the system does not need to perform garbage collection).

The described system can provide an in-memory representation of an F-Map as a sparse array with key-value pairs, as described below in relation to FIGS. 4 and 5. A key can be an integer (e.g., 32 bits or 64 bits). A corresponding value can be an abstract value which can be evaluated to a Boolean value, on which the system can define both sorted iterator and weight functions. The F-Map may be implemented as a sparse array in memory as a Judy array of fixed-size data blocks (e.g., a "slice") of the sparse array. Each slice can represent a power of two of the fixed size array values which can be, e.g., a bitmap (like a two-bit bitmap or "TBB") or structured data elements. If the system defines an F-Map iterator function as a condition (e.g., a "pattern"), the system can iterate over the pattern, or else loop over all the entries. The system can also define am F-Map weight function which calculates the weight of the map, e.g., the number of entries which match the pattern within a given key range.

Furthermore, the F-Map can be shared between HPC cluster nodes in one of two modes: 1) Partitioned mode, in which each node owns a respective partition of the sparse array as a collection of slices which persist on a respective node which owns the respective partition; and 2) Non-Partitioned mode, in which each node owns its own copy of the same sparse array. For example, partitioned mode may be used on server or I/O nodes, and non-partitioned mode may be used on client or compute nodes. An exemplary environment for facilitating placement of data in FAM, including compute nodes using an F-Map in non-partitioned mode and I/O nodes using the F-Map in partitioned mode, is described below in relation to FIG. 9.

The system can use a partitioning scheme which can ensure mapping of a local partition to a respective local database (i.e., local to the I/O node which serves a given F-Map partition). Any process in an HPC cluster (running on a given cluster node) can access both partitioned and non-partitioned F-Maps by instantiating the F-Map on the given cluster node from the persistent store and further by maintaining its state from that point forward. The system can also use local non-persistent F-Maps.

In addition to providing the in-memory F-Map, the system can provide a shared-memory representation of an F-Map, as described below in relation to FIGS. 6A, 6B, and 7. Sharing data structures in computer memory can provide an effective manner to communicate and share data between processes. A shared F-Map can use, e.g., a Posix or System V inter-process communication (IPC) interface. Furthermore, a shared F-Map can facilitate concurrent access by one writer process and multiple reader processes. A shared F-Map can also facilitate an arbitrary start of writer and reader processes on a compute node.

Thus, by providing a system which uses a persistent partitionable distributed map (F-Map), in either a partitioned or non-partitioned mode, the system can result in space allocation improvements, e.g., for multi-processing of global or distributed metadata. The system can also achieve both space and performance efficiency by implementing the F-Map as sparse arrays and sparse ordered two-bit bitmaps in shared memory.

Method for Conversion of TBB to 2D MEB Bitmap; Exemplary Conversions; and Method for Finding Next One As described above, aspects of the system provide a persistent partitionable distributed map or "F-Map." The F-Map can be implemented as a Judy array with key-value pairs, where a respective key is an integer and a corresponding value is a pointer to an array of elements, with values which can be, e.g., a bitmap such as a TBB or structured data elements. While regular single-bit bitmaps may be useful to reflect a binary state, they are not sufficient to store information regarding more complex state transitions. Indeed, a state machine with more than two states generally requires a mutual exclusion (e.g., a binary semaphore) around a critical section. The F-Map can bypass this limitation by using an ordered two-bit bitmap (TBB) in which each two continuous bits define a tetral (4-valued digit), from 0 to 3. Up to four different digits of the tetrad can define a pattern for reducing a TBB to a Boolean value (e.g., a 2D MEB).

Each TBB value can be evaluated as a Boolean with a given pattern, e.g., evaluates to one if the pattern matches the value and evaluates to zero if the pattern does not match the value. The TBB bit set and fill operations require that the pattern has one and only one tetral digit set, i.e., the weight of the pattern must be one. The system can support the TBB atomic operations of set and test_and_set. These atomic operations use a CPU-narrow (e.g., one byte) compare-exchange command.

Exemplary conversions of TBBs to two-dimensional MEB bitmaps are described below in relation to FIGS. 2A-E. The system can decode an MEB with all zero odd bits to a bitmap by unpacking all the even-indexed bits, which can result in reducing the TBB to the bitmap a known method (e.g., "Magic bits," "Lookup Table," or a for-loop). TBB searches can take as input any pattern, and, for a given pattern, bitmap offset, and length, can support at least the following operations: find_first_one( ); find_next_one( ); and weight( ). Thus, the TBB operations described herein can facilitate both weight and sorted iterator functions.

FIG. 1A presents a flowchart 100 illustrating a method which converts a two-bit bitmap (TBB) to a two-dimensional (2D) Morton-encoded Boolean bitmap (MEB), in accordance with an aspect of the present application. Given a TBB value which comprises a first word and a pattern set with one or more of four states, the system determines a size of the pattern set (operation 102). The pattern set can include one to four tetral digits. Each tetral digit can represent one of four possible states (0='00'; 1='01'; 2='10'; and '3'='11'), and the size of the pattern set is a number of tetral digits to search for in the given TBB value or the first word. Tetral digits in a pattern set can be denoted by decimals in a bitfield, as described below in relation to FIG. 2A.

During operation, the system determines if the size of the pattern set is equal to 1 (decision 104). If it is not, the operation continues at Label A of FIG. 1B. If it is, the system performs an exclusive OR (XOR) operation on the first word and an inverse of a mask based on the given pattern to obtain a first temporary value (operation 106). The system performs an AND operation on the first temporary value and a CPU word filled with '10' bits to obtain a second temporary value (operation 108). The system shifts the second temporary value right by one bit to obtain a third temporary value (operation 110). The system performs an AND operation on the first temporary value and the third temporary value to obtain a first MEB (operation 112). The operation returns.

Figure 1B:
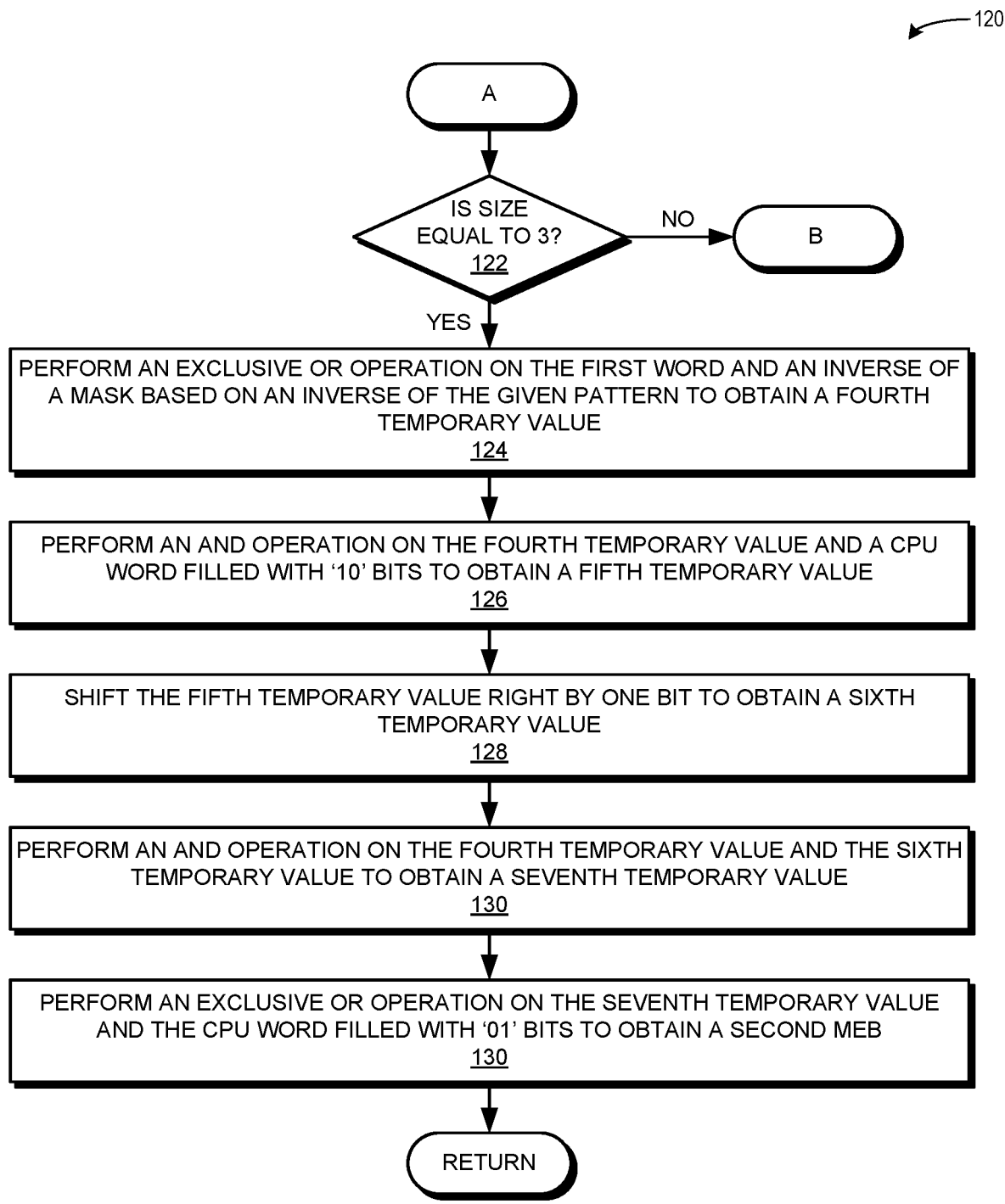
FIG. 1B presents a flowchart illustrating a method which converts a TBB to a 2D MEB, in accordance with an aspect of the present application.

FIG. 1B presents a flowchart 120 illustrating a method which converts a TBB to a 2D MEB, in accordance with an aspect of the present application. During operation, at Label A, the system determines if the size of the pattern set is equal to 3 (decision 122). If it is not, the operation continues at Label B of FIG. 1C. If it is, the system performs an exclusive OR (XOR) operation on the first word and an inverse of a mask based on an inverse of the given pattern to obtain a fourth temporary value (operation 124). The system performs an AND operation on the fourth temporary value and a CPU word filled with '10' bits to obtain a fifth temporary value (operation 126). The system shifts the fifth temporary value right by one bit to obtain a sixth temporary value (operation 128). The system performs an AND operation on the fourth temporary value and the sixth temporary value to obtain a seventh temporary value (operation 130). The system performs an exclusive OR (XOR) operation on the seventh temporary value and the CPU word filled with '01' bits to obtain a second MEB (operation 132). The operation returns.

Figure 1C:
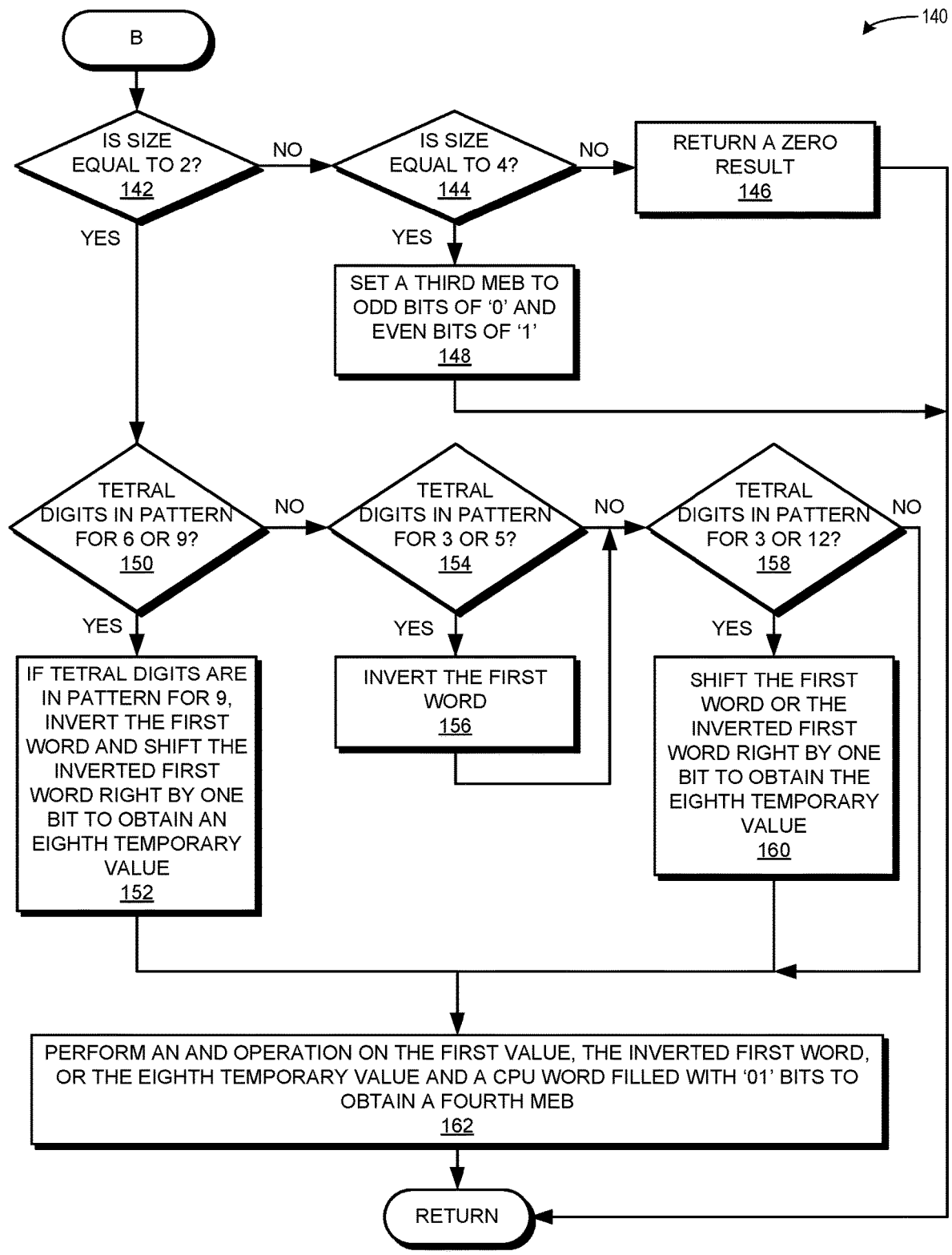
FIG. 1C presents a flowchart illustrating a method which converts a TBB to a 2D MEB, in accordance with an aspect of the present application.

FIG. 1C presents a flowchart 140 illustrating a method which converts a TBB to a 2D MEB, in accordance with an aspect of the present application. During operation, the system determines whether the size of the pattern set is equal to 2 (decision 142). If the pattern set size is not equal to 2 (decision 142), the system determines whether the size of the pattern set is equal to 4 (decision 144). If the pattern set size is equal to 4 (decision 144), the system sets a third MEB to odd bits of '0' and even bits of '1' (operation 148), and the operation returns. If the pattern set size is not equal to 4 (decision 144), the system returns a zero result (operation 146), and the operation returns.

If the pattern set size is equal to 2 (decision 142), the system determines whether the tetral digits in the pattern are for the denoted pattern set (decimal bitfield) of 6 or 9 (decision 150). If it is, and if the tetral digits are in the pattern for 9, the system inverts the first word and shifts the inverted first word right by one to obtain an eighth temporary value (operation 152), and continues at operation 162.

If the tetral digits are not in the pattern for 6 or 9 (decision 150), the system determines whether the tetral digits are in the pattern for 3 or 5 (decision 154). If the tetral digits are not in the pattern for 3 or 5 (decision 154), the operation continues at decision 158. If the tetral digits are in the pattern for 3 or 5 (decision 154), the system inverts the first word (operation 156), and the operation continues at decision 158. The system determines whether the tetral digits are in the pattern for 3 or 12 (decision 158). If the tetral digits are in the pattern for 3 or 12 (decision 158), the system shifts the first word or the inverted first word right by one bit to obtain the eighth temporary value (operation 160), and continues at operation 162. If the tetral digits are not in the pattern for 3 or 12 (decision 158), the operation continues at operation 162.

The system performs an AND operation on the first value (e.g., if the tetral digits are not in the pattern for any of 6, 9, 3, 5, or 12), the inverted first word (e.g., based on operation 156 and if the tetral digit is in the pattern for 5), or the eighth temporary value (e.g., based on operations 152 or 160) and a CPU word filled with '01' bits to obtain a fourth MEB (operation 162). The operation returns.

FIG. 2A depicts a table 200 which indicates how a pattern set is denoted using decimals of a bitfield, in accordance with an aspect of the present application. Table 200 includes columns and multiple entries. The columns or fields of the entries include: a pattern set 202; a bitfield 204; and corresponding tetral digit(s) 206. For example, in an entry 221, a pattern set of 2=0b0010={'01'}, which indicates that the tetral digits belong to, are associated with, or are in the pattern for 2. As additional examples: in an entry 222, a pattern set of 3=0b0011={'00', '01'}, which indicates that the tetral digits are in the pattern for 3; in an entry 223, a pattern set of 5=0b0101={'00', '10'}, which indicates that the tetral digits are in the pattern for 5; in an entry 224, a pattern set of 6=0b0110={'01', '10'}, which indicates that the tetral digits are in the pattern for 6; in an entry 225, a pattern set of 8=0b1000={'11'}, which indicates that the tetral digits are in the pattern for 8; in an entry 226, a pattern set of 9=0b1001={'00', '11'}, which indicates that the tetral digits are in the pattern for 9; and in an entry 227, a pattern set of 12=0b1100={'10', '11'}, which indicates that the tetral digits are in the pattern for 12.

FIG. 2B illustrates an example of converting one CPU word of TBB, given a pattern of {'01'}, to an MEB, for the case of 8-bit CPU word size, corresponding to the flowchart in FIG. 1A, in accordance with an aspect of the present application. A table 230 includes a name 212, a word 214, a pattern set 216, a pattern size 218, and a mask[P]= ((pattern)) 220. In FIG. 2B, for a given TBB of {0, 1, 2, 3}, the word is "00 01 10 11," the pattern set is 2=0b0010={'01'}, the pattern size is 1, and the mask[P] is "01 01 01 01." The system determines that the pattern size is 1, and calculates (t AND ((t AND ((b'10')))>>1)) where t:=w XOR ~mask[P], by the following operations:

The system determines that the size of the pattern set is 1 (as in operations 102 and 104). The system performs an exclusive OR (XOR) operation 231 on the first word and an inverse of a mask based on the given pattern to obtain a first temporary value (as in operation 106). The system performs an AND operation 232 on the first temporary value and four repeating '10' bits to obtain a second temporary value (as in operation 108). The system shifts the second temporary value right by one bit (via a shift operation 233) to obtain a third temporary value (as in operation 110). The system performs an AND operation 234 on the first temporary value and the third temporary value to obtain a first MEB (as in operation 112, to obtain a result 235).

FIG. 2C illustrates an example of converting a TBB, given a pattern of {'00', '10'}, to an MEB, corresponding to the flowchart in FIG. 1C, in accordance with an aspect of the present application. A table 240 shows similar columns or fields as table 230, and indicates that for a given TBB of {1, 3, 0, 2}, the word is "01 11 00 10," the pattern set is 5=0b0010={'00', '10'), the pattern size is 2, and the mask

[P] is "n/a." The system determines that the pattern size is 2 and that the tetral digits are in the pattern for 5, and calculates w:=~w, and (w AND ((b'01'))) by the following operations:

The system determines that the size of the pattern set is equal to 2 (as in decision 142) and determines that the tetral digits are not in the pattern for 6 or 9 (as in decision 150). The system determines that the tetral digits are in the pattern for 3 or 5 (as in decision 154), and inverts the first word (via an invert 241 operation). The system determines that the tetral digits are not in the pattern for 3 or 12 (decision 158), and performs an AND operation 242 on the inverted first word (e.g., based on operation 156 and if the tetral digit is in the pattern for 5) and four repeating '01' bits to obtain a third MEB (as in operation 162, to obtain a result 243).

FIG. 2D illustrates an example of converting a TBB, given a pattern of {'11'}, to an MEB, corresponding to the flowchart in FIG. 1A, in accordance with an aspect of the present application. A table 250 shows similar columns or fields as table 230, and indicates that for a given TBB of {0, 1, 2, 3}, the word is "00 01 10 11," the pattern set is 8=0b1000={'11'}, the pattern size is 1, and the mask[P] is "11 11 11 11." The system determines that the size of the pattern set is 1 (as in operations 102 and 104). The system performs an XOR operation 251 on the first word and an inverse of a mask based on the given pattern to obtain a first temporary value (as in operation 106). The system performs an AND operation 252 on the first temporary value and four repeating '10' bits to obtain a second temporary value (as in operation 108). The system shifts the second temporary value right by one bit (via a shift operation 253) to obtain a third temporary value (as in operation 110). The system performs an AND operation 254 on the first temporary value and the third temporary value to obtain a first MEB (as in operation 112, to obtain a result 255).

FIG. 2E illustrates an example of converting a TBB, given a pattern of {'00', '10', '11'} to a MEB, corresponding to the flowchart in FIG. 1B, in accordance with an aspect of the present application. A table 260 shows similar columns or fields as table 230, and indicates that for a given TBB of {1, 3, 0, 2}, the word is "01 11 00 10," the pattern set is 13=0b1101={'00', '10','11'), the pattern size is 3, and a mask[~P] is "01 01 01 01." The system determines that the pattern size is 3, and calculates: t1:=w XOR ~mask[—P]; t2:=t1 AND ((b'10')); and w=(t1 AND (t2>>1)) XOR (b'01')) by the following operations:

The system determines that the size of the pattern set is equal to 3 (as in decision 122). The system performs an XOR operation 263 on the first word and an inverse of a mask based on an inverse of the given pattern (via an invert operation 262 on an inverse 261 of the given pattern) to obtain a fourth temporary value (as in operation 124). The system performs an AND operation 264 on the fourth temporary value and four repeating '10' bits to obtain a fifth temporary value (as in operation 126). The system shifts the fifth temporary value right by one bit (via a shift operation 265) to obtain a sixth temporary value (as in operation 128). The system performs an AND operation 266 on the fourth temporary value and the sixth temporary value to obtain a seventh temporary value (as in operation 130). The system performs an XOR operation 267 on the seventh temporary value and four repeating '01' bits to obtain a second MEB (as in operation 132, to obtain a result 268).

Thus, FIGS. 2B-2E provide examples of converting a given TBB to a 2D MEB, for the case of 8-bit CPU word size and using the methods described herein and as discussed relating to FIGS. 1A-1C. The system can perform predetermined functions on the resulting values (e.g., the MEBs shown in results 235, 243, 255, and 268). For example, the system can perform a weight function that returns, as the first result, one or more of: a number of elements in the first value which match the pattern; and a sum of values in a key range corresponding to the first value. The system can also perform an iterator function that returns, as the first result, one or more of: an index of a first bit (find_first_one( ) or the native CPU ffs command) or a next bit (find_next_one( )) of the first value which is set to one; and an index of a first bit (find_first_zero( ) or the native CPU clz command) or a next bit (find_next_zero( )) of the first value which is set to zero. Note that the find_first_zero( ) and the find_next_zero( ) functions are in fact the find_first_one( ) and find_next_one( ) functions with a complementary pattern. Furthermore, both the weight and iterator operations on a TBB value can treat skipped values as zeros ('00').

Figure 3:
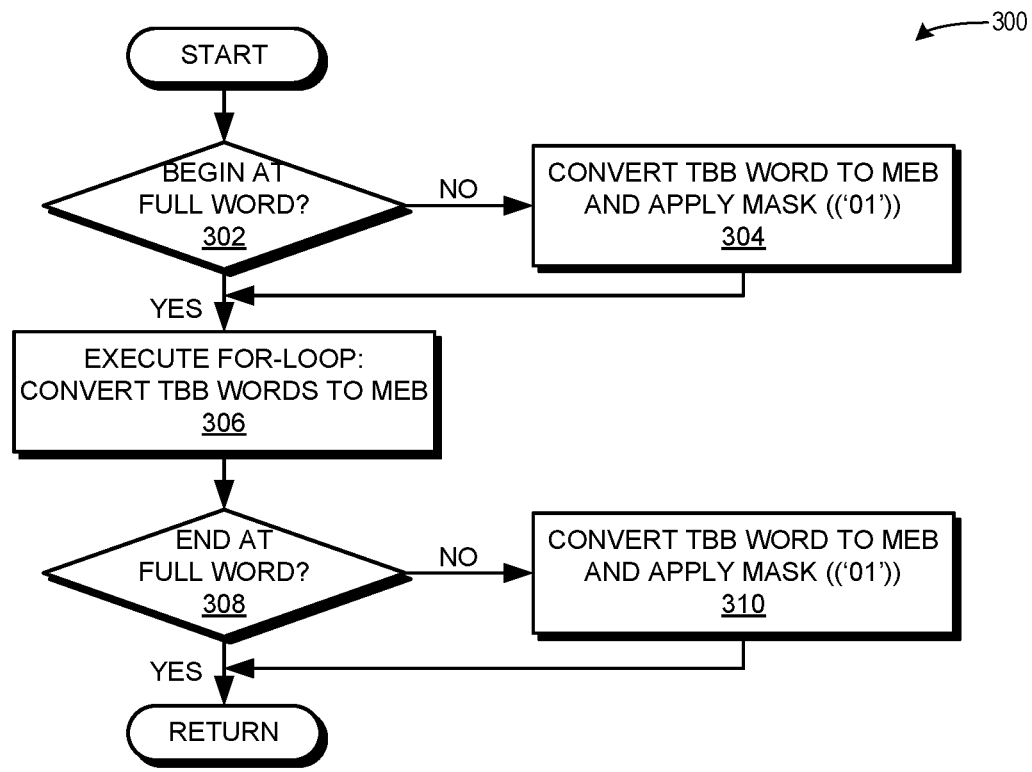
FIG. 3 presents a flowchart illustrating a method which finds a next pattern evaluated to one in a TBB given a pattern, the bitmap offset, and the length, in accordance with an aspect of the present application.

FIG. 3 presents a flowchart 300 illustrating a method which finds a next pattern evaluated to one in a TBB given a pattern, the bitmap offset, and the length, in accordance with an aspect of the present application. During operation, the system determines whether it begins at a full word (decision 302). If it begins at the full word (decision 302), the system executes a for-loop, which converts TBB words to MEB (operation 306), as described above in relation to FIGS. 1A-1C and 2A-2E. The system determines whether it ends at the full word (decision 308). If it ends at the full word (decision 308), the operation returns.

If the system does not begin at the full word (decision 302), the system converts the TBB word to an MEB and applies a mask (('01')) (operation 304), and the operation continues at operation 306. If the system does not end at the full word (decision 308), the system converts the TBB word to an MEB and applies a mask (('01')), and the operation returns.

Representation of F-Map in Memory and Exemplary Method which Facilitates a Global Map (F-Map)

The F-Map described in aspects of this application can be implemented as a Judy array with key-value pairs, where the key is an integer and the value is an abstract which can be evaluated to a Boolean value (e.g., a TBB which can be converted to an MEB, as described above in relation to FIGS. 1A-1C and 2A-2E).

In local memory for every process, the sparse array can be implemented by associative array data structures (i.e., Judy arrays) of pointers to fixed-size data blocks (i.e., slices of a sparse array). Judy arrays can be complex but fast data structures which can be used for storage of data, and generally map an integer key to a pointer. Judy arrays can be based on an adaptive radix tree, and thus may be sparse. Judy arrays can result in achieving both the space and performance efficiency goals described above. For example, tree operations can run in O(log n) time based on the size of the tree. Given large ranges of assigned and unassigned indices, with approximately sequential data (e.g., pointers which make an arithmetic sequence stepping by 64), Judy arrays can result in both significant space and performance efficiency. Furthermore, because Judy arrays can be designed to maintain the number of processor cache line-fills to a minimum, Judy arrays can often perform faster than a hash table.

Figure 4:
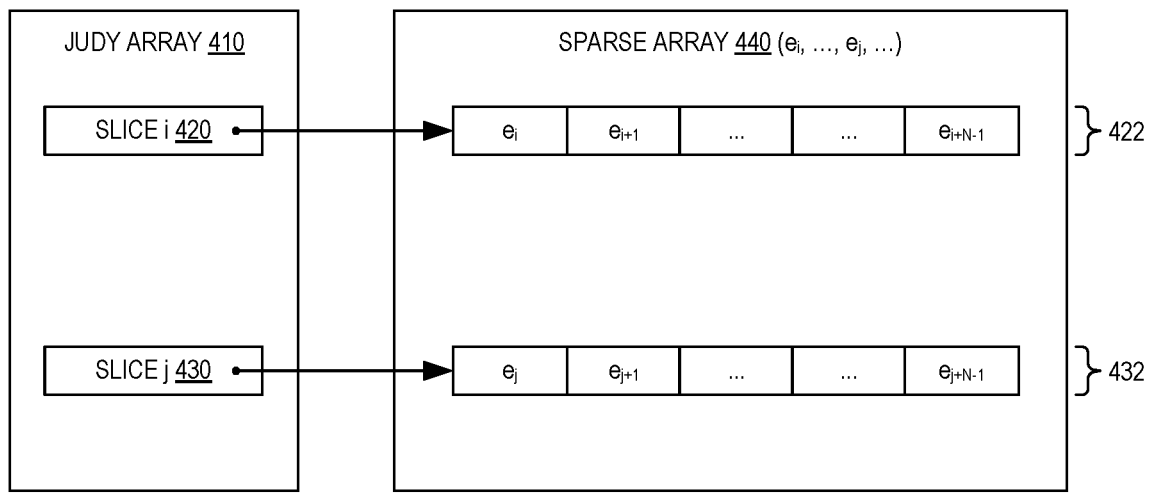
FIG. 4 depicts an exemplary sparse array, implemented as a Judy array with slices which includes pointers to a sparse array of elements, in accordance with an aspect of the present application.

FIG. 4 depicts an exemplary sparse array 400, implemented as a Judy array 410 with slices which includes pointers to a sparse array 440 of elements, in accordance with an aspect of the present application. Judy array 410 can include a plurality of slices, including a slice i 420 and a slice j 430. The "i" and "j" can denote, refer to, or identify a slice, while "N" can denote the number of elements in a sparse array. Slice i 420 can include an integer as a key and a value which is a pointer to a sparse array 422. Sparse array 422 can include elements $\{e_i, e_{i+1}, \ldots, \ldots, e_{i+N-1}\}$. Slice j 430 can include an integer as a key and a value which is a pointer to a sparse array 432. Sparse array 432 can include elements $\{e_j, e_{j+1}, \ldots, \ldots, e_{j+N-1}\}$.

As shown in FIG. 4, a slice can include key-value pairs in a global map or in an F-Map. One index in a Judy array can represent an entire slice of a fixed number of elements. That is: the values in the Judy array can include pointers to sparse arrays; a respective sparse array can include a continuous and fixed number of elements; and the fixed number is a one or a power-of-two. Furthermore, the slice can include a data structure abstraction layer (DSAL) and can represent one or more values in a sparse array, where the values can be one or more of: a bit map; an ordered two-bit bitmap (TBB); and a fixed data structure. Each of these values can be evaluated to a Boolean value. Each slice can include a unique key which represents the subscript of the sparse array that indicates the first value in a respective slice. An ordered collection of slices can make up an F-Map with an integer (e.g., 32 or 64 bit) key and a particular DSAL implementation.

Figure 5:
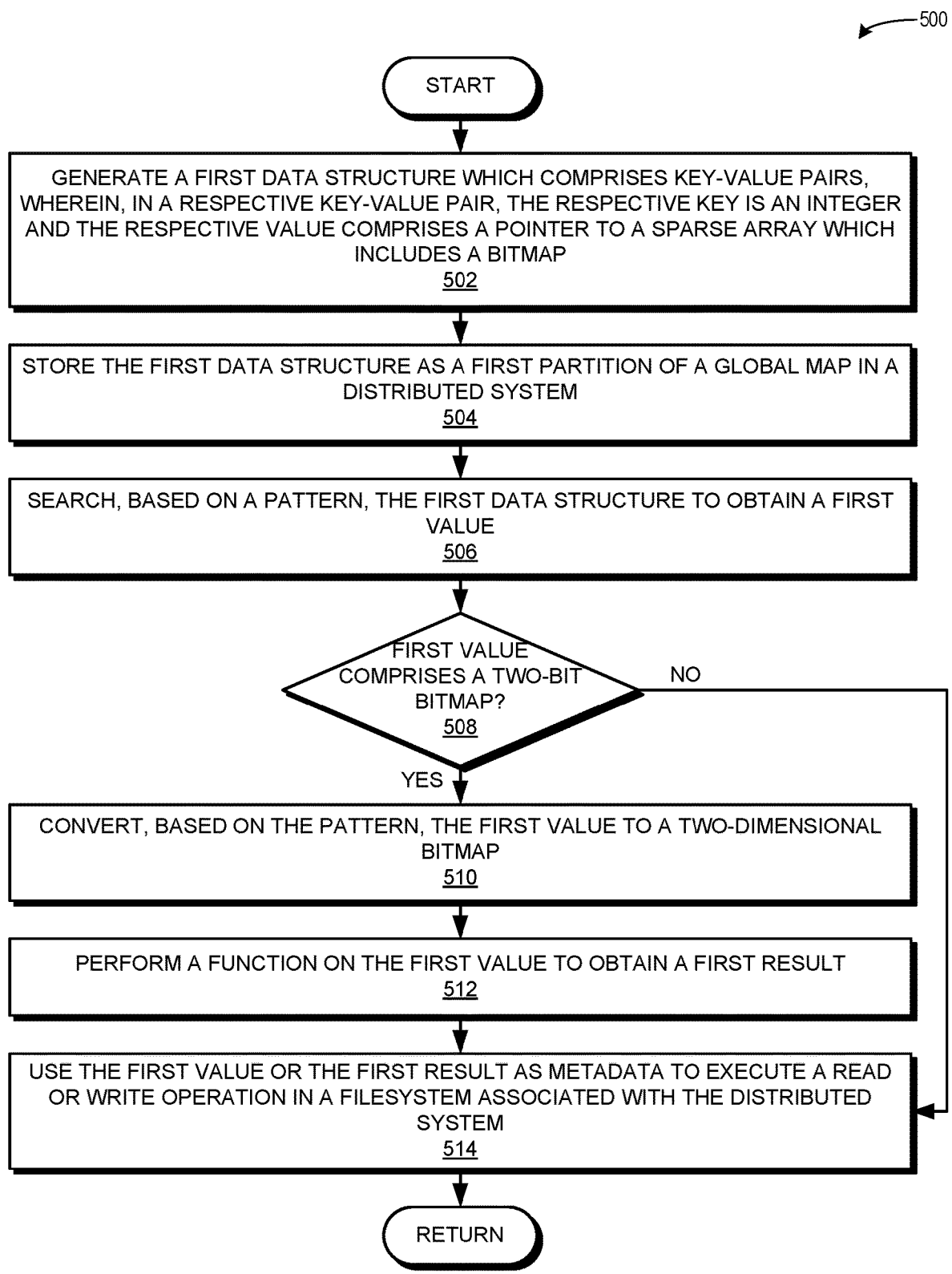
FIG. 5 presents a flowchart illustrating a method which facilitates use of a global map in a distributed filesystem, including using the global map as a stored partition in a memory of a computing node, in accordance with an aspect of the present application.

FIG. 5 presents a flowchart 500 illustrating a method which facilitates use of a global map in a distributed filesystem, including using the global map as a stored partition in a memory of a computing node, in accordance with an aspect of the present application. During operation, the system generates a first data structure which comprises key-value pairs, wherein, in a respective key-value pair, the respective key is an integer and the respective value comprises a pointer to a sparse array which includes a bitmap (operation 502). An example of the bitmap can be a two-bit bitmap. In some aspects, the sparse array can further include a fixed data structure. The system stores the first data structure as a first partition of a global map (operation 504). The system searches, based on a pattern, the first data structure to obtain a first value (operation 506). In one aspect of the application, the system may receive a request to find certain entries in the first data structure which match a particular pattern, e.g., stripes which are in one of four states (such as an allocated or pre-allocated state), as described in relation to FIG. 9.

If the first value comprises a two-bit bitmap (TBB) (decision 508), the system converts, based on the pattern, the first value to a two-dimensional bitmap (operation 510) and performs a function on the first value to obtain a first result (operation 512). The system uses the first value or the first result as metadata to execute a read or write operation in a filesystem associated with the distributed system (operation 514), and the operation returns. If the first value does not comprise a TBB (decision 508), the system performs operation 514, and the operation returns.

Representation of F-Map in Shared Memory and Exemplary Method which Facilitates a Global Map Shared Between Processes on a Compute Node In shared memory (such as memory shared between processes on a single compute node), the "Shared F-Map" or global map can be shared between multiple processes in a "one writer, multiple readers" mode, i.e., accessed concurrently by one writer process and one or more reader processes. The Shared F-Map can use a Posix or System V inter-process communication (IPC) interface (e.g., shm_open( )/mmap( ) or shmget( )/shmget( )/shmat( ) to create, attach, detach and destroy shared memory regions for the sparse array. The Shared F-Map can facilitate an arbitrary start of writer and reader processes, which ensures that reader processes should wait for a writer process to begin or become active. Thus, the shared memory region is common and can be synchronized.

Recall that a slice includes key-value pairs as a DSAL in the global map. Each slice can have an integer for a unique key, and a value which is a pointer to a sparse array. The sparse array can include values which are, e.g., TBBs or a fixed data structure. Thus, an ordered collection of slices can make up an F-Map with an integer (e.g., 32 or 64 bit) key and a particular DSAL implementation. A superslice can be a slice which includes a plurality of slices, where each slice is a shared memory region. A writer process can maintain a superslice which is implemented as a Judy array of slices. A reader process can attach to and read the common superblock (shared memory region) first, and then attach to one (or more) slices if the superslice is updated. Exemplary uses of a global map by a writer process and a reader process are described below in relation to, respectively, FIGS. 6A and 6B.

A common way to implement writer-to-reader event-driven synchronization can be based on an update counter in the dedicated shared memory region, e.g., the superslice. The synchronization access can ensure up-to-date reader data, and can also allow for independent and concurrent (re)-start of the writer and reader processes. In addition, the F-Map can inherit the read-copy-update (RCU) synchronization mechanism from Judy arrays, e.g., from the Linux kernel to userspace with an open source Userspace RCU (URCU) package. The RCU read-side lock can protect critical sections (e.g., during node lookup or insertion) in F-Maps.

Figure 6A:
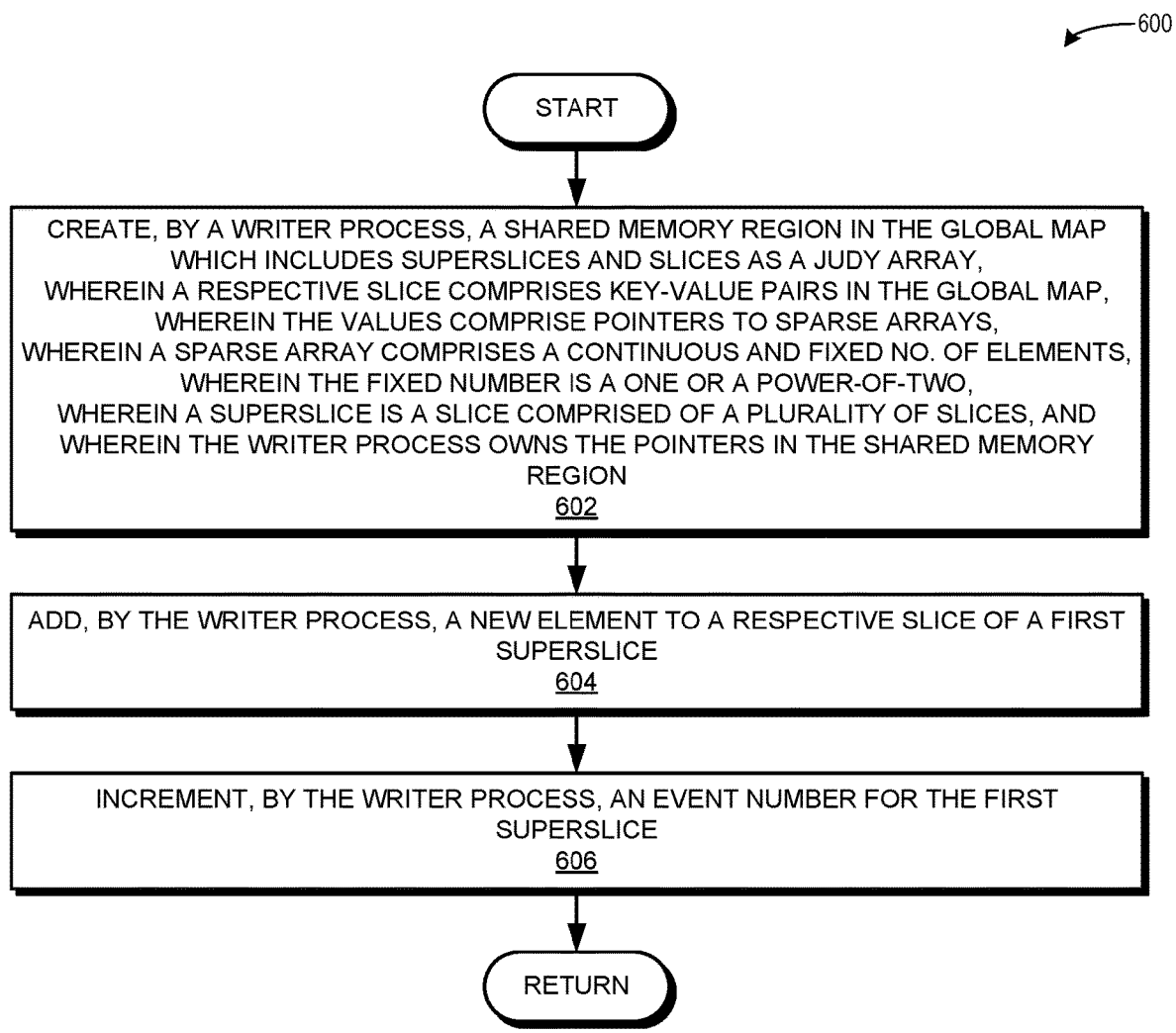
FIG. 6A presents a flowchart illustrating a method which facilitates use of a global map in a distributed filesystem, including use by a writer process of the global map in its entirety in a shared memory of a computing node, in accordance with an aspect of the present application.

FIG. 6A presents a flowchart 600 illustrating a method which facilitates use of a global map in a distributed filesystem, including use by a writer process of the global map in its entirety in a shared memory of a computing node, in accordance with an aspect of the present application. During operation, the system creates, by a writer process, a shared memory region in the global map which includes superslices and slices as a Judy array, wherein a respective slice comprises key-value pairs in the global map, wherein the values comprise pointers to sparse arrays, wherein a respective sparse array comprises a continuous and fixed number of elements, wherein the fixed number is a one or a power-of-two, wherein a superslice is a slice comprised of a plurality of slices, and wherein the writer process owns the pointers in the shared memory region (operation 602). The system adds, by the writer process, a new element to a respective slice of a first superslice (operation 604), and the system increments, by the writer process, an event number for the first superslice (operation 606). The operation returns.

Figure 6B:
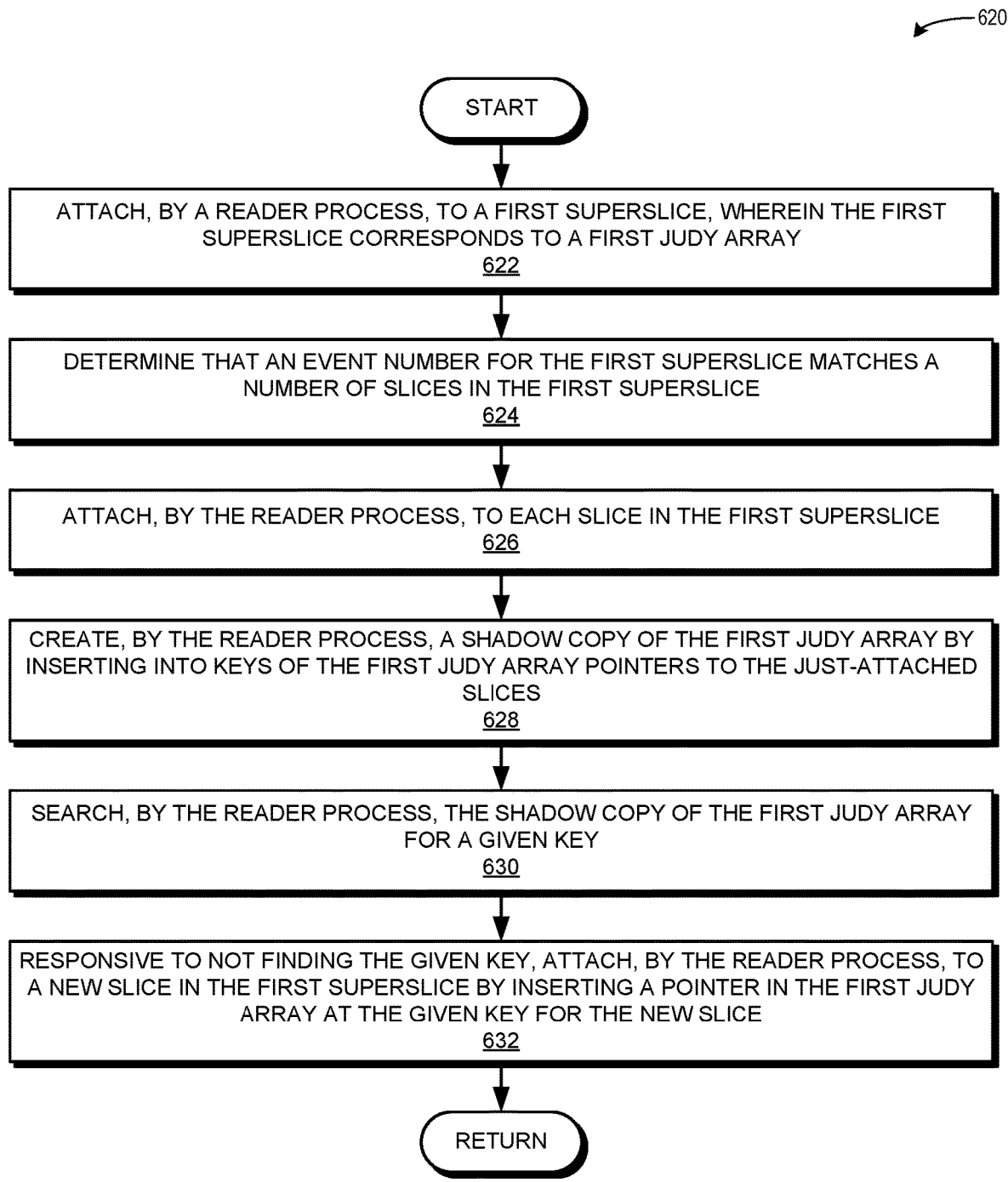
FIG. 6B presents a flowchart illustrating a method which facilitates use of a global map in a distributed filesystem, including use by a reader process of the global map in its entirety in a shared memory of a computing node, in accordance with an aspect of the present application.

FIG. 6B presents a flowchart 620 illustrating a method which facilitates use of a global map in a distributed filesystem, including use by a reader process of the global map in its entirety in a shared memory of a computing node, in accordance with an aspect of the present application. During operation, the system attaches, by a reader process, to a first superslice, wherein the first superslice corresponds to a first Judy array (operation 622). The system determines that an event number for the first superslice matches a number of slices in the first superslice (operation 624). Updates to event numbers for superslices are protected by, but not limited to, POSIX shared mutex or a hardware atomic, and multi-process access to a slice can be lockless due to the hardware cache coherence.

Responsive to determining that the event number for the first superslice matches the number of slices in the first superslice, the system attaches, by the reader process, to each slice in the first superslice (operation 626). The system creates, by the reader process, a shadow copy of the first Judy array by inserting into keys of the first Judy array pointers to the just-attached slices (operation 628).

Subsequently, the system searches, by the reader process, the shadow copy of the first Judy array for a given key (operation 630). Responsive to not finding the given key, the system attaches, by the reader process, to a new slice in the first superslice by inserting a pointer in the first Judy array at the given key for the new slice (operation 632). The operation returns.

Figure 7:
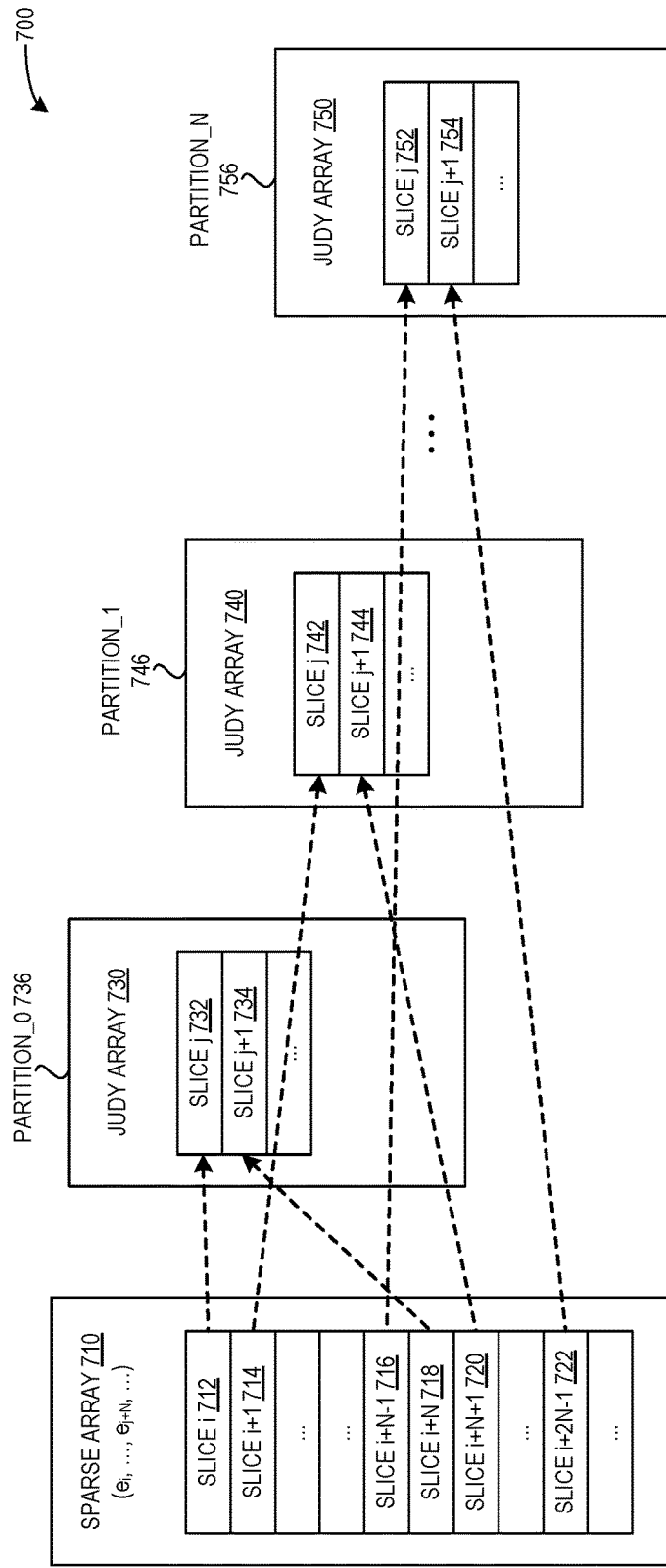
FIG. 7 depicts an exemplary partitioned sparse array, as a Judy array with slices which includes pointers to a sparse array of elements, in accordance with an aspect of the present application.

FIG. 7 depicts an exemplary partitioned sparse array 700, as a Judy array with slices which includes pointers to a sparse array of elements, in accordance with an aspect of the present application. Sparse array 710 can represent a Shared F-Map or a global map, and can include a plurality of slices, e.g.: a slice i 712; a slice i+1 714; a slice i+N−1 716; a slice i+N 718; a slice i+n+1 720; and a slice i+2N−1 722. Sparse array 710 can be partitioned into N partitions, including: a partition_0 736; a partition_1 746; and a partition_N 756. The "i" denotes the slice element of sparse array 710, and the "N" corresponds to a number of partitions (e.g., 736, 746, and 756).

Each partition can be a Judy array with slices from sparse array 710, where the slices are distributed from the global map to the partitions in an interwoven manner, as shown by the dashed arrows. For example, partition_0 736 can be a Judy array 730 with a slice j 732 (which corresponds to slice i 712) and a slice j+1 734 (which corresponds to slice i+N 718). Partition_1 746 can be a Judy array 740 with a slice j 742 (which corresponds to slice i+1 714) and a slice j+1 744 (which corresponds to slice i+N+1 720). Partition_N 756 can be a Judy array 750 with a slice j 752 (which corresponds to slice i+N−1 716) and a slice j+1 754 (which corresponds to slice i+2N−1 722). Note the linear mapping between the distributed F-Map keys (in spare array 710) and the same element keys in each respective partition.

The system can load the persistent F-Map from and flush the F-Map to a distributed key-value store (DKVS) in batches of key-value pairs, such that each value makes up a persistent unit (PU). That is, every record in the DKVS is a persistent unit (PU) can include a key-value pair, where the value can include one or a power-of-two map entries. Thus, in FIG. 7, the "i" and "j" indicate keys in the DKVS, while the values are the sparse arrays.

The DKVS can use a local database backend, e.g., a Level DB as illustrated below in FIG. 9 or a Multi-Dimensional Hierarchical Indexing Middleware (MDHIM). The system can flush an updated F-Map back to the DKVS, by supporting both database insert and delete operations. The system can distribute the persistent F-Map between a plurality of compute nodes in two ways. In the first way, each node can own a partition of the sparse array as a collection slices which make up the partitioned F-Map (as in the I/O nodes illustrated below in FIG. 9). In the second way, each node can access or own the full sparse array, global map, or F-Map (as in the compute nodes illustrated below in FIG. 10). Note that any arbitrary process may access the partitioned F-Map as a non-partitioned F-Map or data structure.

Exemplary Application of FAM Filesystem Stripe Allocation and Exemplary FAM Environment In one aspect of this application, the system can be used to store high-performance metadata maps in a Gen-Z based fabric attached memory (FAM) filesystem (FAMfs). Dynamic space allocation using F-Maps as metadata maps is described below in relation to FIG. 9.

Figure 8:
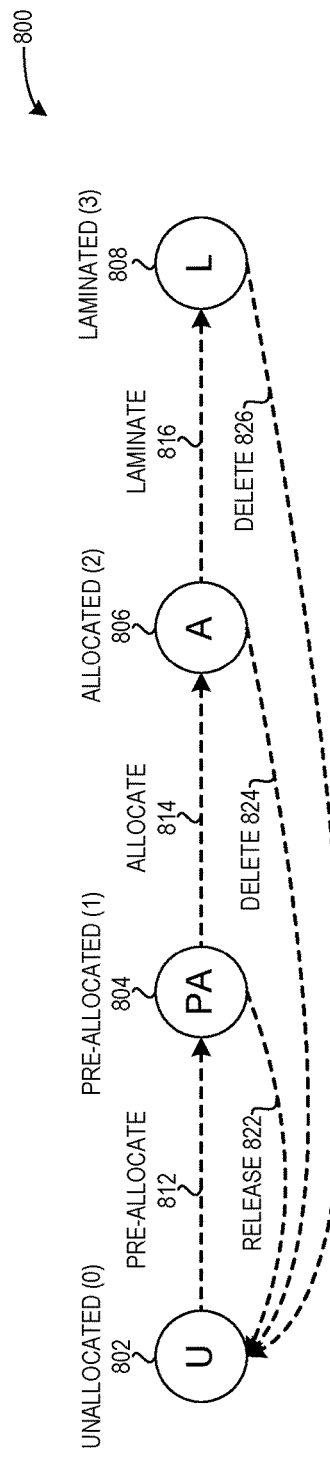
FIG. 8 depicts an exemplary diagram with four states which indicate the status of stripes in a distributed filesystem, in accordance with an aspect of the present application.

FIG. 8 depicts an exemplary diagram 800 with four states which indicate the status of stripes in a distributed filesystem, in accordance with an aspect of the present application. Diagram 800 includes four states: an unallocated 802 state indicated by a "U" and corresponding to a value of "0" (e.g., a tetral digit value of '00'); a pre-allocated 804 state, indicated by a "PA" and corresponding to a value of "1" (e.g., a tetral digit value of '01'); an allocated 806 state, indicated by an "A" and corresponding to a value of "2" (e.g., a tetral digit value of '10'); and a laminated 808 state, indicated by an "L" and corresponding to a value of "3" (e.g., a tetral digit value of '11'). During operation, the system can pre-allocate an unallocated stripe (via an operation 812), which changes the state from unallocated to pre-allocated. The system can also allocate a pre-allocated stripe (via an operation 814), which changes the state from pre-allocated to allocated. The system can further laminate (e.g., perform data recovery processing, such as erasure coding) an allocated stripe (via an operation 816), which changes the state from allocated to laminated.

Furthermore, the system can delete a laminated stripe (via an operation 826), which changes the state from laminated to unallocated. The system can delete an allocated stripe (via an operation 824), which changes the state from allocated to unallocated. The system can release a pre-allocated stripe (via an operation 822), which changes the state from pre-allocated to unallocated.

Figure 9:
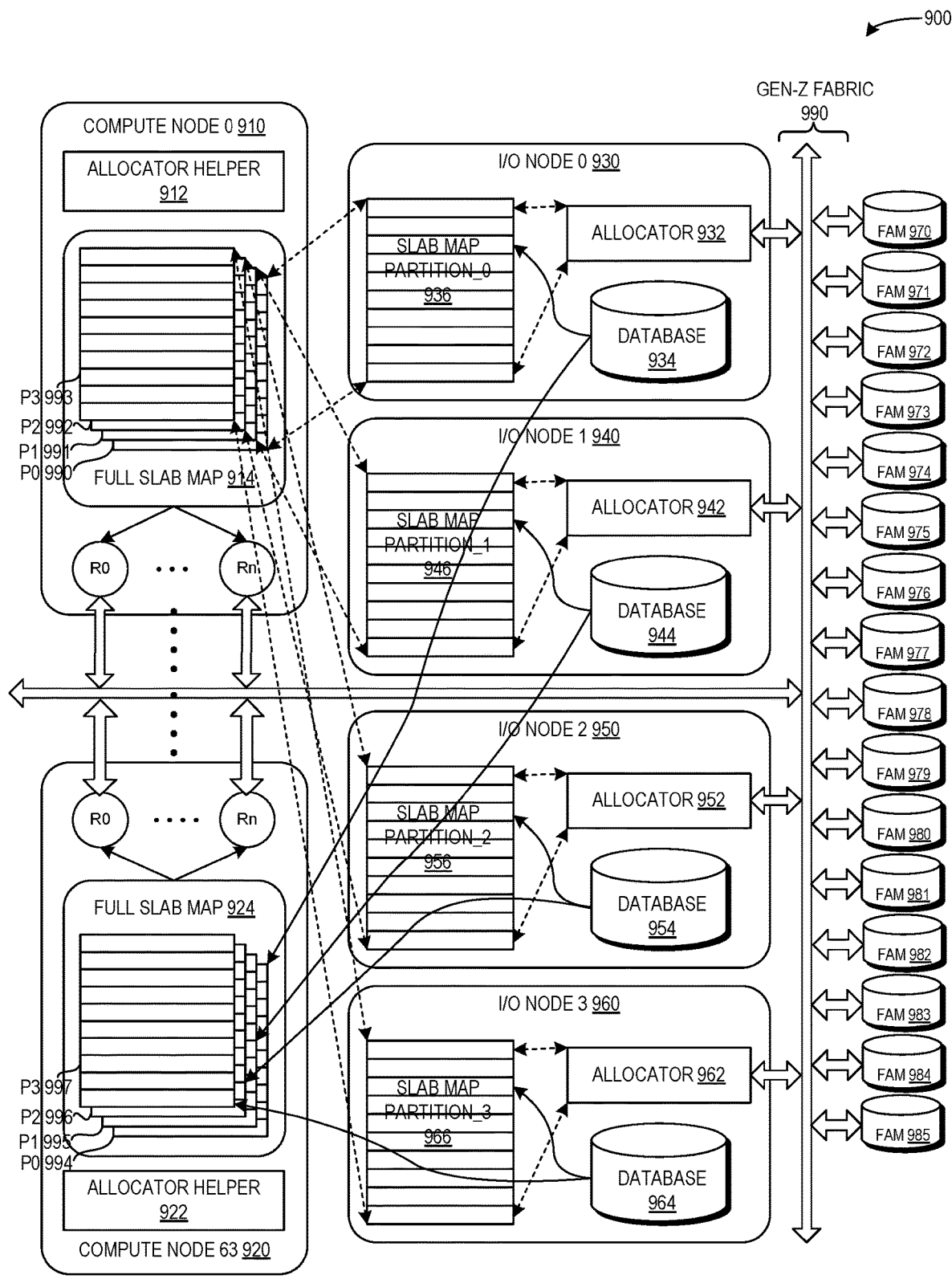
FIG. 9 depicts an exemplary environment for facilitating placement of data in a distributed system, in accordance with an aspect of the present application.

FIG. 9 depicts an exemplary environment 900 for facilitating placement of data in a distributed system, in accordance with an aspect of the present application. Environment 900 can indicate a distributed system such as a FAM filesystem (FAMfs) which includes: a plurality of compute nodes, such as a compute node 0 910 and a compute node 63 920; a plurality of I/O nodes, such as an I/O node 0 930, an I/O node 1 940, an I/O node 2 950, and an I/O node 3 960; and a plurality of fabric attached memory (FAM) modules 971-985.

In the FAMfs of FIG. 9, FAM address space can be organized into a series of chunks, while a FAM module can be allocated in "extents." An extent can be a minimum unit of FAM allocation from a single FAM module. FAMfs can organize extents (which are allocated from different FAM modules) into "slabs" to facilitate implementation of a specific data protection scheme (which can be set at the file level). A slab can be used as a container for "stripes" (e.g., by serving as containers for allocation of stripes). Stripes are collections of data chunks with the same protection level as the respective container slab. A "slab map" is a data structure which can describe the geometry and construction of a layout, i.e., which FAM extents are placed together to form a respective slab to support a specific protection scheme. A slab map can be implemented with the F-Map properties as described herein.

The compute nodes and the I/O nodes of environment 900 can communicate with each other over a network, and the I/O nodes can communicate with the FAM modules over a Gen-Z fabric 990. Each I/O node can include an allocator module, a local backend storage device, and a partition of a global distributed map, such as a slab map in the FAMfs. For example, I/O node 0 930 can include: an allocator 932; a database 934; and a slab map partition_0 936. I/O node 1 940 can include: an allocator 942, a database 944; and a slab map partition_1 946. I/O node 2 950 can include: an allocator 952; a database 954; and a slab map partition_2

956. I/O node 3 960 can include: an allocator 962; a database 964; and a slab map partition_3 966.

Each compute node can include an allocator helper module, and a full slab map, e.g., a shared F-Map or an F-Map in shared memory accessible and used by multiple processes within a respective compute node. For example, compute node 0 910 can include an allocator helper 912 and a full slab map 914, which can be accessed by multiple processes RO to Rn on compute node 0 910. Similarly, compute node 63 920 can include an allocator helper 922 and a full slab map 924, which can be accessed by multiple processes RO to Rn on compute node 63 920.

In environment 900, I/O nodes can maintain and access slab map partitions. Specifically, each allocator can retrieve its slab map partition from its database and maintain the partition in memory. For example, I/O node 3 960 can maintain slab map partition_3 966, and can retrieve partition_3 from and flush an updated partition_3 to database 964 (as depicted by the pair of dashed arrows from allocator 962 to slab map partition_3 966 and by the arrow from database 964 to slab map partition_3 966). Similarly: I/O node 0 930 can maintain slab map partition_0 936, and can retrieve partition_0 from and flush an updated partition_0 to database 934 (as depicted by the pair of dashed arrows from allocator 932 to slab map partition_0 936 and by the arrow from database 934 to slab map partition_0 936); I/O node 1 940 can maintain slab map partition_1 946, and can retrieve partition_1 from and flush an updated partition_1 to database 944 (as depicted by the pair of dashed arrows from allocator 942 to slab map partition_1 946 and by the arrow from database 944 to slab map partition_1 946); and I/O node 2 950 can maintain slab map partition_2 956, and can retrieve partition_2 from and flush an updated partition_2 to database 954 (as depicted by the pair of dashed arrows from allocator 952 to slab map partition_2 956 and by the arrow from database 954 to slab map partition_2 956).

Client processes in compute nodes can access the F-Map in shared memory directly from the metadata store. Specifically, each allocator helper module in a compute node can manage and access a complete slab map, e.g., the global map or the F-Map, in shared memory accessed by all client processes RO to Rn. Each allocator helper module can retrieve all slab map partitions directly from a database of an I/O node.

For example, compute node 63 920 can retrieve a partition_3 from and flush an updated partition_3 back to database 964 of I/O node 3 960 (as depicted by the arrow from database 964 to a partition P3 997 of full slab map 924). Compute node 63 920 can also retrieve and flush other partitions from/to databases of other I/O nodes, e.g.: partition_2 from/to database 954, as depicted by the arrow from database 954 to a partition P2 996 of full slab map 924; partition_1 from/to database 944, as depicted by the arrow from database 944 to a partition P1 995 of full slab map 924; and partition_0 from/to database 934, as depicted by the arrow from database 934 to a partition P0 994 of full slab map 924. These operations can eliminate the need for additional metadata requests in order to resolve the stripe address and offset in FAMfs.

Another data structure in FAMfs which can use the F-Map structure and properties is the "claim vector" (not shown in FIG. 9). The claim vector is a data structure (based on an ordered bit sparse array or bitmap) indicating which stripes in a layout are in one of four states (i.e., unallocated/free, pre-allocated, allocated, and laminated), as described above in relation to FIG. 8. The claim vector can be implemented using the ordered two-bit bitmap described herein.

Exemplary Computer System and Apparatus

Figure 10:
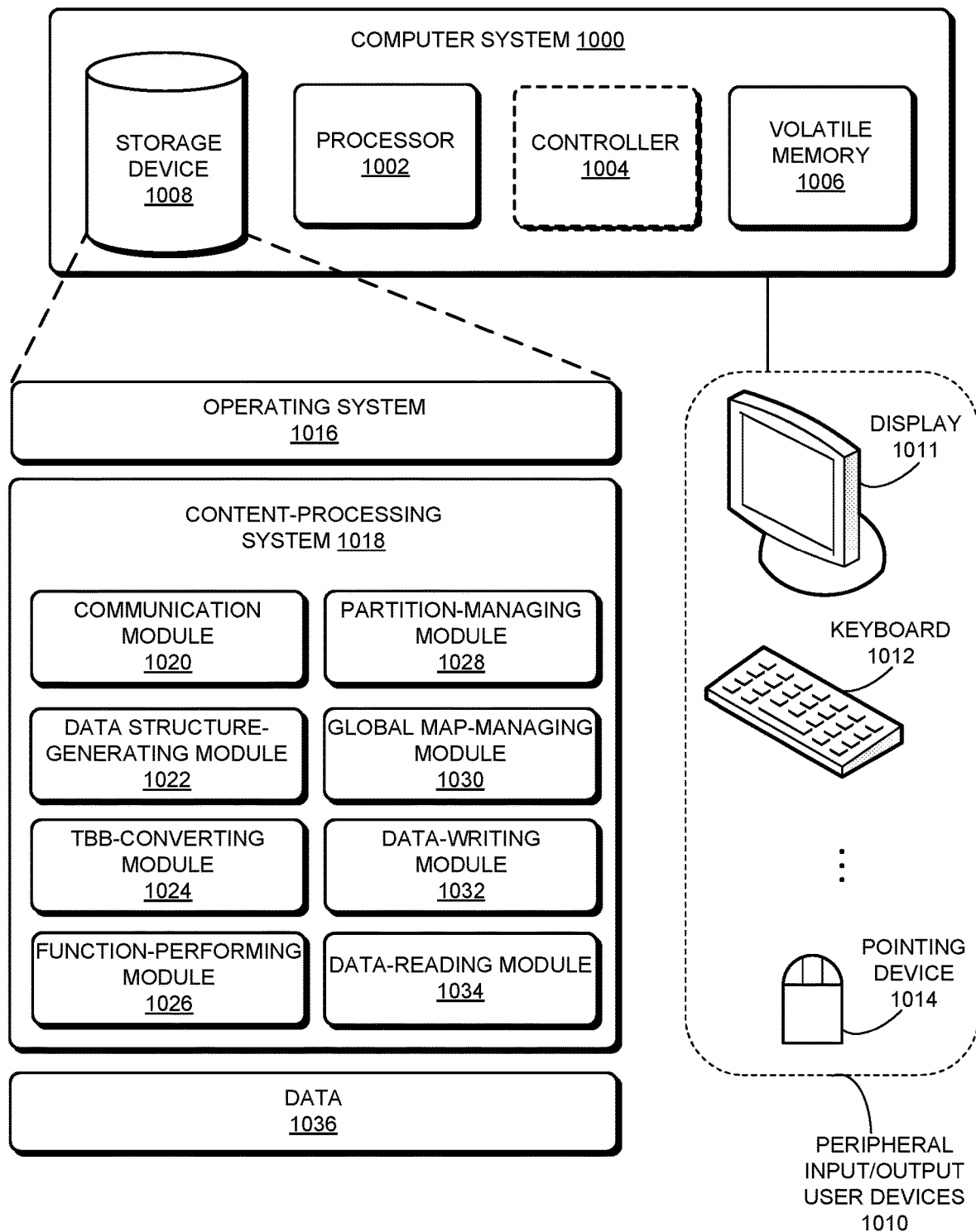
FIG. 10 illustrates an exemplary computer system which facilitates a global map in a distributed system, in accordance with an aspect of the present application.

FIG. 10 illustrates an exemplary computer system 1000 which facilitates a global map in a distributed system, in accordance with an aspect of the present application. Computer system 1000 includes a processor 1002, a volatile memory 1006, and a storage device 1008. In some aspects, computer system 1000 can include a controller 1004 (indicated by the dashed lines). Volatile memory 1006 can include, e.g., random access memory (RAM), that serves as a managed memory, and can be used to store one or more memory pools. Storage device 1008 can include persistent storage which can be managed or accessed via processor 1002 (or controller 1004). Furthermore, computer system 1000 can be coupled to peripheral input/output (I/O) user devices 1010, e.g., a display device 1011, a keyboard 1012, and a pointing device 1014. Storage device 1008 can store an operating system 1016, a content-processing system 1018, and data 1036.

Content-processing system 1018 can include instructions, which when executed by computer system 1000, can cause computer system 1000 or processor 1002 to perform methods and/or processes described in this disclosure. Specifically, content-processing system 1018 can include instructions for receiving and transmitting data packets, including data associated with a data structure or key-value pairs, a key, a value, a pointer, a sparse array, an element, a bitmap, a TBB, a fixed data structure, a two-dimensional bitmap, a read/write request, a command to perform a function, and metadata (communication module 1020).

Content-processing system 1018 can further include instructions for generating a first data structure which comprises key-value pairs, wherein a respective key is an integer and a respective value comprises a pointer to a sparse array which includes one or more of a bitmap, an ordered two-bit bitmap, and a fixed data structure (data structure-generating module 1022). Content-processing system 1018 can include instructions for storing the first data structure as a first partition of the global map (partition-managing module 1028 and data-writing module 1032). Content-processing system 1018 can include instructions for searching, based on a pattern, the first data structure to obtain a first value (partition-managing module 1028). Content-processing system 1018 can also include instructions for, responsive to determining that the first value comprises a two-bit bitmap (TBB-converting module 1024): converting, based on the pattern, the first value to a two-dimensional bitmap (TBB-converting module 1024); and performing a predetermined function on the first value to obtain a first result (function-performing module 1026). Content-processing system 1018 can include instructions for using the first value or the first result as metadata to execute a read or write operation in a filesystem associated with the distributed system (data-writing module 1032 and data-reading module 1034).

Content-processing system 1018 can also include instructions for storing, in a non-volatile memory associated with a first I/O node of the distributed system, the first data structure as the first partition of the global map (partition-managing module 1028). Content-processing system 1018 can include instructions for maintaining, by a first compute node of the distributed system, the global map by: accessing, in the non-volatile memory associated with the first I/O node, the first data structure stored as the first partition; and accessing, in non-volatile memory associated with other I/O nodes of the distributed system, other data structures stored as other partitions of the global map (global-map managing module 1030). Content-processing system 1018 can additionally include instructions for performing the operations described above in relation to FIG. 6A (data-writing module 1032) and FIG. 6B (data-reading module).

Data 1036 can include any data that is required as input or generated as output by the methods and/or processes described in this disclosure. Specifically, data 1036 can store at least: a data structure; a key-value pair; an integer; a pointer; a sparse array; a Judy array; an element of an array or a sparse array; a bitmap; a TBB; a fixed data structure; a partition of a global map; a global map; a partitioned F-Map; a shared F-Map; a pattern; a value; a temporary value; a two-dimensional bitmap; a Boolean value; a MEB; a pre-determined function; metadata; an indicator of a shared memory region; an indicator of a compute node, an I/O node, a FAM module, or a FAMfs; an indicator of a writer process or a reader process; a state; one or more of four states; an indicator of an unallocated state, a pre-allocated state, an allocated state, and a laminated state; an erasure coding (EC); EC-encoded or EC-decoded data; a result of a bitwise XOR, AND, inversion, or SHIFT operation; a pattern; a mask; an inverted mask or pattern; a pattern set; a size of a pattern set; a slice; a superslice; a number of slices in a superslice; a fixed number of elements which is a one or a power-of-two; an event number; a shadow copy of an array, a sparse array, or a Judy array; a weight function; and an iterator function.

Figure 11:
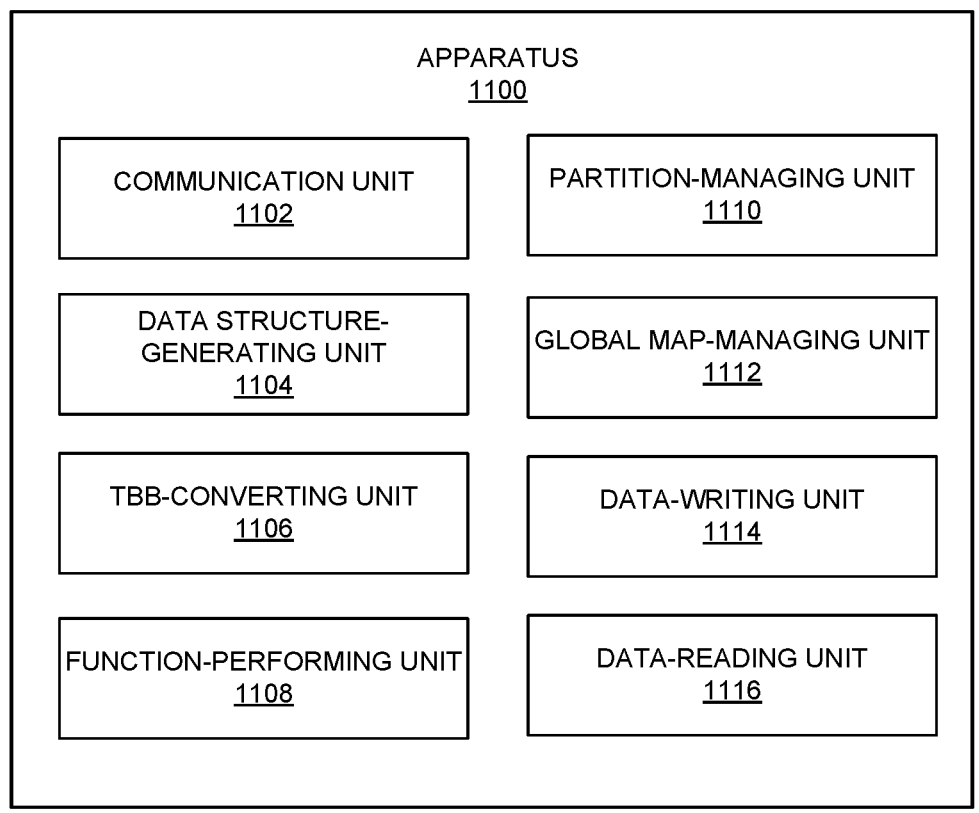
FIG. 11 illustrates an exemplary apparatus which facilitates a global map in a distributed system, in accordance with an aspect of the present application.

FIG. 11 illustrates an exemplary apparatus 1100 which facilitates a global map in a distributed system, in accordance with an aspect of the present application. Apparatus 1100 can comprise a plurality of units or apparatuses which may communicate with one another via a wired, wireless, quantum light, or electrical communication channel. Apparatus 1100 may be realized using one or more integrated circuits, and may include fewer or more units or apparatuses than those shown in FIG. 11. Furthermore, apparatus 1100 may be integrated in a computer system, or realized as a separate device or devices capable of communicating with other computer systems and/or devices.

Apparatus 1100 may also include a non-volatile storage system or a memory management unit. Apparatus 1100 can comprise modules, logic blocks, or units 1102-1116 which are configured to perform functions or operations similar to modules 1020-1034 of computer system 1000 of FIG. 10, including: a communication unit 1102; a data structure-generating unit 1104; a TBB-converting unit 1106; a function-performing unit 1108; a partition-managing unit 1110; a global map-managing unit 1112; a data-writing unit 1114; and a data-reading unit 1116.

In general, the disclosed aspects provide a solution which can achieve both space and performance efficiency in a distributed system by using a persistent partitionable distributed map (F-Map), which can be implemented using sparse arrays and sparse ordered two-bit bitmaps in shared memory. The aspects of the F-Map described herein can use a Judy array and a userspace RCU C Library, which can ensure that the implementation of the sparse array may be implemented in C. As a result of using the userspace RCU C Library, the described aspects of the F-Map can benefit both from native cache coherence as well as lightweight locking. Thus, by providing a system which uses a persistent partitionable distributed map (F-Map), in either a partitioned or non-partitioned mode, the system can result in space allocation improvements, e.g., for multi-processing of global or distributed metadata (as described above in relation to FIGS. 8 and 9).

One aspect of this application facilitates a global map in a distributed system. The system generates a first data structure which comprises key-value pairs, wherein, in a respective key-value pair, the respective key is an integer and the respective value comprises a pointer to a sparse array which includes a bitmap. The system stores the first data structure as a first partition of a global map. The system searches, based on a pattern, the first data structure to obtain a first value. Responsive to determining that the first value comprises a two-bit bitmap, the system converts, based on the pattern, the first value to a two-dimensional bitmap, and the system performs a function on the first value to obtain a first result. The system uses the first value or the first result as metadata to execute a read or write operation in a filesystem associated with the distributed system.

In a variation on this aspect, the distributed system comprises computing nodes, a first computing node accesses the first data structure in a memory of the first computing node by accessing only the stored first partition of the global map, and a second computing node accesses the first data structure in a shared memory region of the second computing node by accessing the global map.

In a variation on this aspect, the distributed system comprises computing nodes which include compute nodes and I/O nodes, the distributed system further comprises fabric attached memory (FAM), the filesystem is a fabric attached memory filesystem (FAMfs), and the global map stores data or metadata used by the compute nodes and the I/O nodes to operate the filesystem associated with the distributed system.

In a further variation, the system stores, in a non-volatile memory associated with a first I/O node of the distributed system, the first data structure as the first partition of the global map. The system maintains, by a first compute node of the distributed system, the global map by: accessing, in the non-volatile memory associated with the first I/O node, the first data structure stored as the first partition; and accessing, in non-volatile memory associated with other I/O nodes of the distributed system, other data structures stored as other partitions of the global map. The global map can be accessed concurrently by one writer process and one or more reader processes, and the writer process and the one or more reader processes may start arbitrarily.

In a variation on this aspect, the bitmap included in the sparse array comprises an ordered two-bit bitmap, which comprises four tetral digits corresponding to one of four states.

In a further variation, a set corresponding to the pattern comprises one or more of the four states, the two-dimensional bitmap is a two-dimensional Morton-encoded Boolean (MEB) bitmap, and the first value comprises a first word. The system converts, based on the pattern, the first value which comprises the two-bit bitmap (TBB) to the two-dimensional MEB bitmap, if a size of the pattern set is 1, by the following operations. The system performs an exclusive OR operation on the first word and an inverse of a mask based on the given pattern to obtain a first temporary value. The system performs an AND operation on the first temporary value and a CPU word filled with '10' bits to obtain a second temporary value. The system shifts the second temporary value right by one bit to obtain a third temporary value. The system performs an AND operation on the first temporary value and the third temporary value to obtain a first MEB.

In a further variation, the system converts, based on the pattern, the first value which comprises the two-bit bitmap (TBB) to the two-dimensional MEB bitmap, if the size of the pattern set is 3, by the following operations. The system performs an exclusive OR operation on the first word and an inverse of a mask based on an inverse of the given pattern to obtain a fourth temporary value. The system performs an AND operation on the fourth temporary value and the CPU word filled with '10' bits to obtain a fifth temporary value. The system shifts the fifth temporary value right by one bit to obtain a sixth temporary value. The system performs an AND operation on the fourth temporary value and the sixth temporary value to obtain a seventh temporary value. The system performs an exclusive OR operation on the seventh temporary value and the CPU word filled with '01' bits to obtain a second MEB.

In a further variation, the system converts, based on the pattern, the first value which comprises the two-bit bitmap (TBB) to the two-dimensional MEB bitmap, if the size of the pattern set is 2, by the following operations. The system performs, based on which two tetral digits are included in the pattern set, one or more of: inverting the first word; and shifting the inverted first word right by one bit to obtain an eighth temporary value. The system performs an AND operation on the first value, the inverted first word, or the eighth temporary value and the CPU word filled with '01' bits to obtain a third MEB.

In a variation on this aspect, the system creates, by a writer process, a shared memory region in the global map which includes superslices and slices as a Judy array. A respective slice comprises key-value pairs in the global map. The values comprise pointers to sparse arrays, wherein a respective sparse array comprises a continuous and fixed number of elements. The sparse array can include one or more of a bitmap (such as an ordered two-bit bitmap) and a fixed data structure. The fixed number is a one or a power-of-two. A superslice is a slice comprised of a plurality of slices. The writer process owns the pointers in the shared memory region.

In a further variation, the system, by the writer process, adds a new element to a respective slice of a first superslice and increments an event number for the first superslice.

In a further variation, the system attaches, by a reader process, to a first superslice, wherein the first superslice corresponds to a first Judy array. Responsive to determining that an event number for the first superslice matches a number of slices in the first superslice, the system, by the reader process: attaches to each slice in the first superslice, and creates a shadow copy of the first Judy array by inserting into keys of the first Judy array pointers to the just-attached slices.

In a further variation on this aspect, the system searches, by the reader process, the shadow copy of the first Judy array for a given key. Responsive to not finding the given key, the system attaches, by the reader process, to a new slice in the first superslice by inserting a pointer in the first Judy array at the given key for the new slice.

In a variation on this aspect, the function is one of more of a weight function and an iterator function. The weight function returns, as the first result, one or more of: a number of elements in the first value which match the pattern; and a sum of values in a key range corresponding to the first value. The iterator function returns, as the first result, one or more of: an index of a first bit or a next bit of the first value which is set to one; and an index of a first bit or a next bit of the first value which is set to zero.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware devices or apparatus. For example, the hardware devices or apparatus can include, but are not limited to, application-specific integrated circuit (ASIC) chips, field-programmable gate arrays (FPGAs), dedicated or shared processors that execute a particular software program or a piece of code at a particular time, and other programmable-logic devices now known or later developed. When the hardware devices or apparatus are activated, the hardware modules perform the methods and processes included within them.

The foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A method comprising:
 generating a first data structure which comprises key-value pairs,
  wherein, in a respective key-value pair, the respective key is an integer and the respective value comprises a pointer to a sparse array which includes a bitmap;
 storing the first data structure as a first partition of a global map;
 searching, based on a pattern, the first data structure to obtain a first value;
 responsive to determining that the first value comprises a two-bit bitmap:
  converting, based on the pattern, the first value to a two-dimensional bitmap; and
  performing a function on the first value to obtain a first result; and
 using the first value or the first result as metadata to execute a read or write operation in a filesystem associated with the distributed system.

2. The method of claim 1,
 wherein the distributed system comprises computing nodes,
 wherein a first computing node accesses the first data structure in a memory of the first computing node by accessing only the stored first partition of the global map, and
 wherein a second computing node accesses the first data structure in a shared memory region of the second computing node by accessing the global map.

3. The method of claim 1,
 wherein the distributed system comprises computing nodes which include compute nodes and I/O nodes,
 wherein the distributed system further comprises fabric attached memory (FAM), wherein the filesystem is a fabric attached memory filesystem (FAMfs), and
wherein the global map stores data or metadata used by the compute nodes and the I/O nodes to operate the filesystem associated with the distributed system.

4. The method of claim 3, further comprising:
storing, in a non-volatile memory associated with a first I/O node of the distributed system, the first data structure as the first partition of the global map; and
maintaining, by a first compute node of the distributed system, the global map by:
  accessing, in the non-volatile memory associated with the first I/O node, the first data structure stored as the first partition; and
  accessing, in non-volatile memory associated with other I/O nodes of the distributed system, other data structures stored as other partitions of the global map,
wherein the global map can be accessed concurrently by one writer process and one or more reader processes, and
wherein the writer process and the one or more reader processes may start arbitrarily.

5. The method of claim 1,
wherein the bitmap included in the sparse array comprises an ordered two-bit bitmap, which comprises four tetral digits corresponding to one of four states.

6. The method of claim 5,
wherein a set corresponding to the pattern comprises one or more of the four states,
wherein the two-dimensional bitmap is a two-dimensional Morton-encoded Boolean (MEB) bitmap,
wherein the first value comprises a first word, and
wherein converting, based on the pattern, the first value which comprises the two-bit bitmap (TBB) to the two-dimensional MEB bitmap, if a size of the pattern set is 1, comprises:
  performing an exclusive OR operation on the first word and an inverse of a mask based on the given pattern to obtain a first temporary value;
  performing an AND operation on the first temporary value and a CPU word filled with '10' bits to obtain a second temporary value;
  shifting the second temporary value right by one bit to obtain a third temporary value; and
  performing an AND operation on the first temporary value and the third temporary value to obtain a first MEB.

7. The method of claim 6, wherein converting, based on the pattern, the first value which comprises the two-bit bitmap (TBB) to the two-dimensional MEB bitmap, if the size of the pattern set is 3, comprises:
  performing an exclusive OR operation on the first word and an inverse of a mask based on an inverse of the given pattern to obtain a fourth temporary value;
  performing an AND operation on the fourth temporary value and the CPU word filled with '10' bits to obtain a fifth temporary value;
  shifting the fifth temporary value right by one bit to obtain a sixth temporary value;
  performing an AND operation on the fourth temporary value and the sixth temporary value to obtain a seventh temporary value; and
  performing an exclusive OR operation on the seventh temporary value and the CPU word filled with '01' bits to obtain a second MEB.

8. The method of claim 6, wherein converting, based on the pattern, the first value which comprises the two-bit bitmap (TBB) to the two-dimensional MEB bitmap, if the size of the pattern set is 2, comprises:
  performing, based on which two tetral digits are included in the pattern set, one or more of:
    inverting the first word; and
    shifting the inverted first word right by one bit to obtain an eighth temporary value; and
  performing an AND operation on the first value, the inverted first word, or the eighth temporary value and the CPU word filled with '01' bits to obtain a third MEB.

9. The method of claim 1, further comprising:
creating, by a writer process, a shared memory region in the global map which includes superslices and slices as a Judy array,
wherein a respective slice comprises key-value pairs in the global map,
wherein the values comprise pointers to sparse arrays, wherein a respective sparse array comprises a continuous and fixed number of elements,
wherein the fixed number is a one or a power-of-two,
wherein a superslice is a slice comprised of a plurality of slices, and
wherein the writer process owns the pointers in the shared memory region.

10. The method of claim 9, further comprising:
adding, by the writer process, a new element to a respective slice of a first superslice; and
incrementing, by the writer process, an event number for the first superslice.

11. The method of claim 9, further comprising:
attaching, by a reader process, to a first superslice, wherein the first superslice corresponds to a first Judy array;
responsive to determining that an event number for the first superslice matches a number of slices in the first superslice:
  attaching, by the reader process, to each slice in the first superslice; and
  creating, by the reader process, a shadow copy of the first Judy array by inserting into keys of the first Judy array pointers to the just-attached slices.

12. The method of claim 11, further comprising:
searching, by the reader process, the shadow copy of the first Judy array for a given key; and
responsive to not finding the given key:
  attaching, by the reader process, to a new slice in the first superslice by inserting a pointer in the first Judy array at the given key for the new slice.

13. The method of claim 9, wherein the function is one of more of:
a weight function that returns, as the first result, one or more of:
  a number of elements in the first value which match the pattern; and
  a sum of values in a key range corresponding to the first value; and
an iterator function that returns, as the first result, one or more of:
  an index of a first bit or a next bit of the first value which is set to one; and
  an index of a first bit or a next bit of the first value which is set to zero.

14. A computer system which is part of a distributed system, wherein the computer system comprises:

a processor; and a memory coupled to the processor and storing instructions which, when executed by the processor, cause the processor to perform a method, the method comprising:

generating a first data structure which comprises key-value pairs,
wherein, in a respective key-value pair, the respective key is an integer and the respective value comprises a pointer to a sparse array which includes a bitmap;

storing the first data structure as a first partition of a global map;

searching, based on a pattern, the first data structure to obtain a first value;

responsive to determining that the first value comprises a two-bit bitmap:
converting, based on the pattern, the first value to a two-dimensional bitmap; and
performing a function on the first value to obtain a first result; and using the first value or the first result as metadata to execute a read or write operation in a filesystem associated with the distributed system.

15. The computer system of claim 14,
wherein the distributed system comprises computing nodes,
wherein a first computing node accesses the first data structure in a memory of the first computing node by accessing only the stored first partition of the global map, and
wherein a second computing node accesses the first data structure in a shared memory region of the second computing node by accessing the global map.

16. The computer system of claim 14,
wherein the distributed system comprises computing nodes which include compute nodes and I/O nodes,
wherein the distributed system further comprises fabric attached memory (FAM),
wherein the filesystem is a fabric attached memory filesystem (FAMfs), and
wherein the global map stores data or metadata used by the compute nodes and the I/O nodes to operate the filesystem associated with the distributed system.

17. The computer system of claim 16, wherein the method further comprises:
storing, in a non-volatile memory associated with a first I/O node of the distributed system, the first data structure as the first partition of the global map; and
maintaining, by a first compute node of the distributed system, the global map by:
accessing, in the non-volatile memory associated with the first I/O node, the first data structure stored as the first partition; and
accessing, in non-volatile memory associated with other I/O nodes of the distributed system, other data structures stored as other partitions of the global map,
wherein the global map can be accessed concurrently by one writer process and one or more reader processes, and
wherein the writer process and the one or more reader processes may start arbitrarily.

18. The computer system of claim 14,
wherein the ordered two-bit bitmap comprises four tetral digits which correspond to one of four states,
wherein a set corresponding to the pattern comprises one or more of the four states, wherein the two-dimensional bitmap is a two-dimensional Morton-encoded Boolean (MEB) bitmap,
wherein the first value comprises a first word, and
wherein converting, based on the pattern, the first value which comprises the two-bit bitmap (TBB) to the two-dimensional MEB bitmap comprises:
responsive to determining that a size of the pattern set is 1:
performing an exclusive OR operation on the first word and an inverse of a mask based on the given pattern to obtain a first temporary value;
performing an AND operation on the first temporary value and a CPU word filled with '10' bits to obtain a second temporary value;
shifting the second temporary value right by one bit to obtain a third temporary value; and
performing an AND operation on the first temporary value and the third temporary value to obtain a first MEB;
responsive to determining that the size of the pattern set is 3:
performing an exclusive OR operation on the first word and an inverse of a mask based on an inverse of the given pattern to obtain a fourth temporary value;
performing an AND operation on the fourth temporary value and the CPU word filled with '10' bits to obtain a fifth temporary value;
shifting the fifth temporary value right by one bit to obtain a sixth temporary value;
performing an AND operation on the fourth temporary value and the sixth temporary value to obtain a seventh temporary value; and
performing an exclusive OR operation on the seventh temporary value and the CPU word filled with '01' bits to obtain a second MEB;
responsive to determining that the size of the pattern set is 2:
performing, based on which two tetral digits are included in the pattern set, one or more of:
inverting the first word; and
shifting the inverted first word right by one bit to obtain an eighth temporary value; and
performing an AND operation on the first value, the inverted first word, or the eighth temporary value and the CPU word filled with '01' bits to obtain a third MEB.

19. The computer system of claim 14, wherein the method further comprises:
creating, by a writer process, a shared memory region in the global map which includes superslices and slices as a Judy array,
wherein a respective slice comprises key-value pairs in the global map,
wherein the values comprise pointers to sparse arrays,
wherein a respective sparse array comprises a continuous and fixed number of elements,
wherein the fixed number is a one or a power-of-two,
wherein a superslice is a slice comprised of a plurality of slices, and
wherein the writer process owns the pointers in the shared memory region;
adding, by the writer process, a new element to a respective slice of a first superslice;
incrementing, by the writer process, an event number for the first superslice;

attaching, by a reader process, to a first superslice, wherein the first superslice corresponds to a first Judy array;

responsive to determining that an event number for the first superslice matches a number of slices in the first superslice:

attaching, by the reader process, to each slice in the first superslice; and creating, by the reader process, a shadow copy of the first Judy array by inserting into keys of the first Judy array pointers to the just-attached slices;

searching, by the reader process, the shadow copy of the first Judy array for a given key; and responsive to not finding the given key:

attaching, by the reader process, to a new slice in the first superslice by inserting a pointer in the first Judy array at the given key for the new slice.

20. A non-transitory computer-readable storage medium storing instructions that when executed by a computer cause the computer to perform a method, the method comprising:

generating a first data structure which comprises key-value pairs, wherein, in respective key-value pair, the respective key is an integer and the respective value comprises a pointer to a sparse array which includes a bitmap;

storing the first data structure as a first partition of a global map;

searching, based on a pattern, the first data structure to obtain a first value;

responsive to determining that the first value comprises a two-bit bitmap:

converting, based on the pattern, the first value to a two-dimensional bitmap; and performing a function on the first value to obtain a first result; and using the first value or the first result as metadata to execute a read or write operation in a filesystem associated with the distributed system.

\* \* \* \* \*